United States Patent
Holzer et al.

(10) Patent No.: US 10,210,662 B2
(45) Date of Patent: Feb. 19, 2019

(54) LIVE AUGMENTED REALITY USING TRACKING

(71) Applicant: Fyusion, Inc., San Francisco, CA (US)

(72) Inventors: Stefan Johannes Josef Holzer, San Mateo, CA (US); Alexander Jay Bruen Trevor, San Francisco, CA (US); Martin Saelzle, San Francisco, CA (US); Stephen David Miller, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 26 days.

(21) Appl. No.: 15/374,910

(22) Filed: Dec. 9, 2016

(65) Prior Publication Data

US 2018/0165879 A1    Jun. 14, 2018

(51) Int. Cl.
| | |
|---|---|
| *G06T 19/00* | (2011.01) |
| *G06T 7/70* | (2017.01) |
| *G06T 7/20* | (2017.01) |
| *G06F 3/01* | (2006.01) |
| *G06T 11/00* | (2006.01) |
| *G06T 7/55* | (2017.01) |

(52) U.S. Cl.
CPC ............ *G06T 19/006* (2013.01); *G06F 3/011* (2013.01); *G06T 7/20* (2013.01); *G06T 7/55* (2017.01); *G06T 7/70* (2017.01); *G06T 11/00* (2013.01); *G06T 2207/20221* (2013.01)

(58) Field of Classification Search
CPC ................................................... G06T 19/006
See application file for complete search history.

(56) References Cited

U.S. PATENT DOCUMENTS

| | | | |
|---|---|---|---|
| 2009/0248304 A1 | 10/2009 | Roumeliotis | |
| 2012/0075424 A1* | 3/2012 | Kawamoto | G06T 19/006 348/46 |
| 2013/0307842 A1* | 11/2013 | Grinberg | G06F 3/1431 345/419 |

(Continued)

OTHER PUBLICATIONS

"U.S. Appl. No. 15/376,537, Non Final Office Action dated Jan. 24, 2018", 15 pages.

(Continued)

*Primary Examiner* — Yi Yang
(74) *Attorney, Agent, or Firm* — Kwan & Olynick LLP

(57) ABSTRACT

Various embodiments of the present invention relate generally to systems and methods for analyzing and manipulating images and video. According to particular embodiments, the spatial relationship between multiple images and video is analyzed together with location information data, for purposes of creating a representation referred to herein as a surround view for presentation on a device. A real object can be tracked in the live image data for the purposes of creating a surround view using a number of tracking points. As a camera is moved around the real object, virtual objects can be rendered into live image data to create synthetic images where a position of the tracking points can be used to position the virtual object in the synthetic image. The synthetic images can be output in real-time. Further, virtual objects in the synthetic images can be incorporated into surround views.

17 Claims, 20 Drawing Sheets

(56) References Cited

U.S. PATENT DOCUMENTS

| | | | |
|---|---|---|---|
| 2014/0028714 A1* | 1/2014 | Keating | G06T 19/006 |
| | | | 345/633 |
| 2014/0129176 A1 | 5/2014 | Ramanandan | |
| 2014/0321702 A1 | 10/2014 | Schmalstieg | |
| 2015/0169169 A1* | 6/2015 | Andersson | G06F 3/0488 |
| | | | 715/765 |
| 2015/0170367 A1* | 6/2015 | Nachman | G06T 7/0042 |
| | | | 382/106 |

OTHER PUBLICATIONS

"U.S. Appl. No. 15/376,537, Notice of Allowance and Examiner Interview Summary dated Mar. 26, 2018", 8 pages.

\* cited by examiner

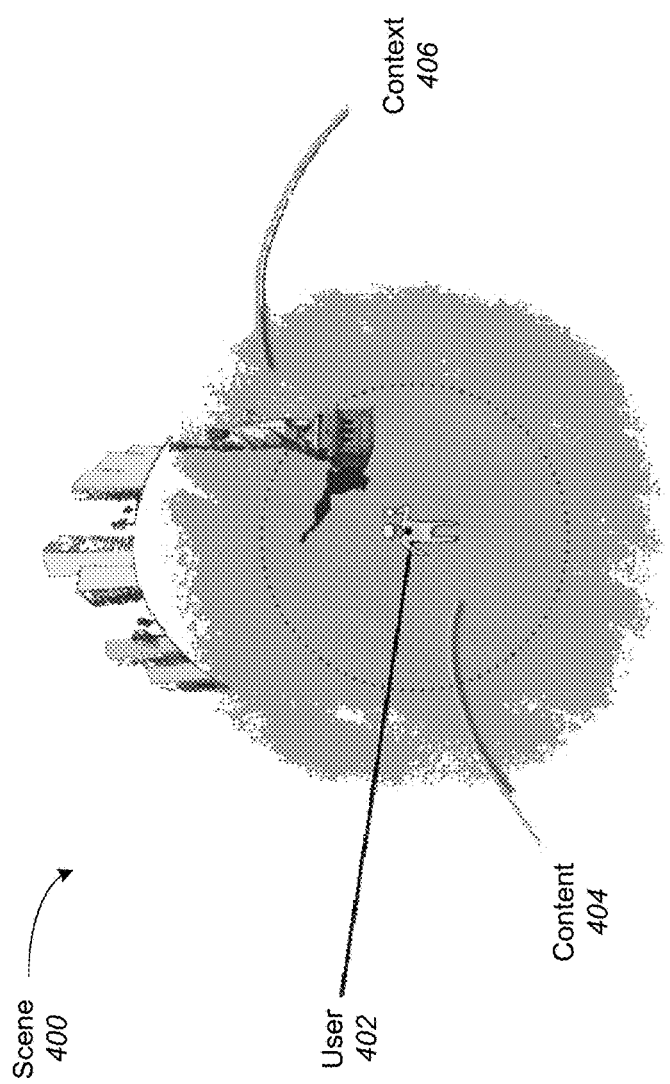

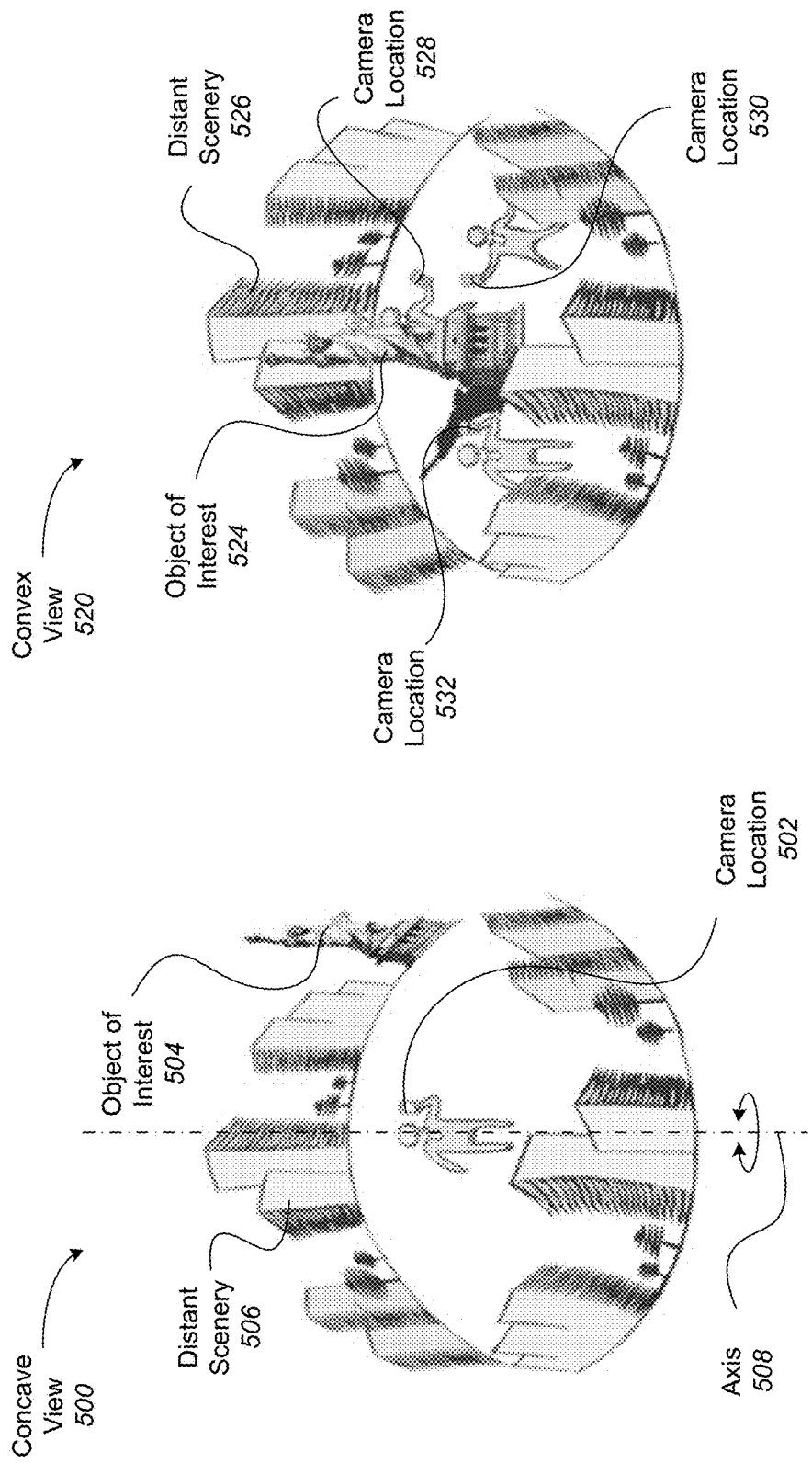

LIVE AUGMENTED REALITY USING TRACKING

TECHNICAL FIELD

The present disclosure relates to augmenting multi-view image data with synthetic objects. In one example, the present disclosure relates to using inertial measurement unit (IMU) and image data to generate views of synthetic objects to be placed in a multi-view image or rendered into live image data.

Augmented reality typically includes a view of a real-world environment, such as through video and/or image data of scenery, a sports game, an object, individual, etc. This view of the real-world environment is augmented by computer generated input such as images, text, video, graphics, or the like. Accordingly, augmented reality can take the form of a live-action video or photo series with added elements that are computer-generated. Augmented reality is distinct from virtual reality, in which a simulated environment is depicted through video and/or image data.

In some implementations, augmented reality applications may add three-dimensional (3D) information to video and image data. This is generally done by creating a 3D reconstruction of the scene. However, this process is computationally expensive and usually restricted to static scenes. Accordingly, improved methods of implementing augmented reality are desirable.

OVERVIEW

Various embodiments of the present invention relate generally to systems and methods for analyzing and manipulating images and video. According to particular embodiments, the spatial relationship between multiple images and video is analyzed together with location information data, for purposes of creating a representation referred to herein as a surround view for presentation on a device. An object included in the surround view may be manipulated along axes by manipulating the device along corresponding axes. In particular embodiments, an augmented reality (AR) system is used for the purposes of capturing images used in a surround view. For example, live image data from camera of a mobile device can be augmented with virtual guides that help a user position the mobile device during image capture.

BRIEF DESCRIPTION OF THE DRAWINGS

The disclosure may best be understood by reference to the following description taken in conjunction with the accompanying drawings, which illustrate particular embodiments of the present invention.

FIG. 4 illustrates one example of separation of content and context in a surround view.

FIGS. 5A-5B illustrate examples of concave view and convex views, respectively, where both views use a back-camera capture style.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a surround view, which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a surround view. For example, a virtual guide can be inserted into live image data from a mobile. The virtual guide can help the user guide the mobile device along a desirable path useful for creating the surround view. The virtual guide in the AR images can respond to movements of the mobile device. The movement of mobile device can be determined from a number of different sources, including but not limited to an Inertial Measurement Unit and image data.

Figure 1:
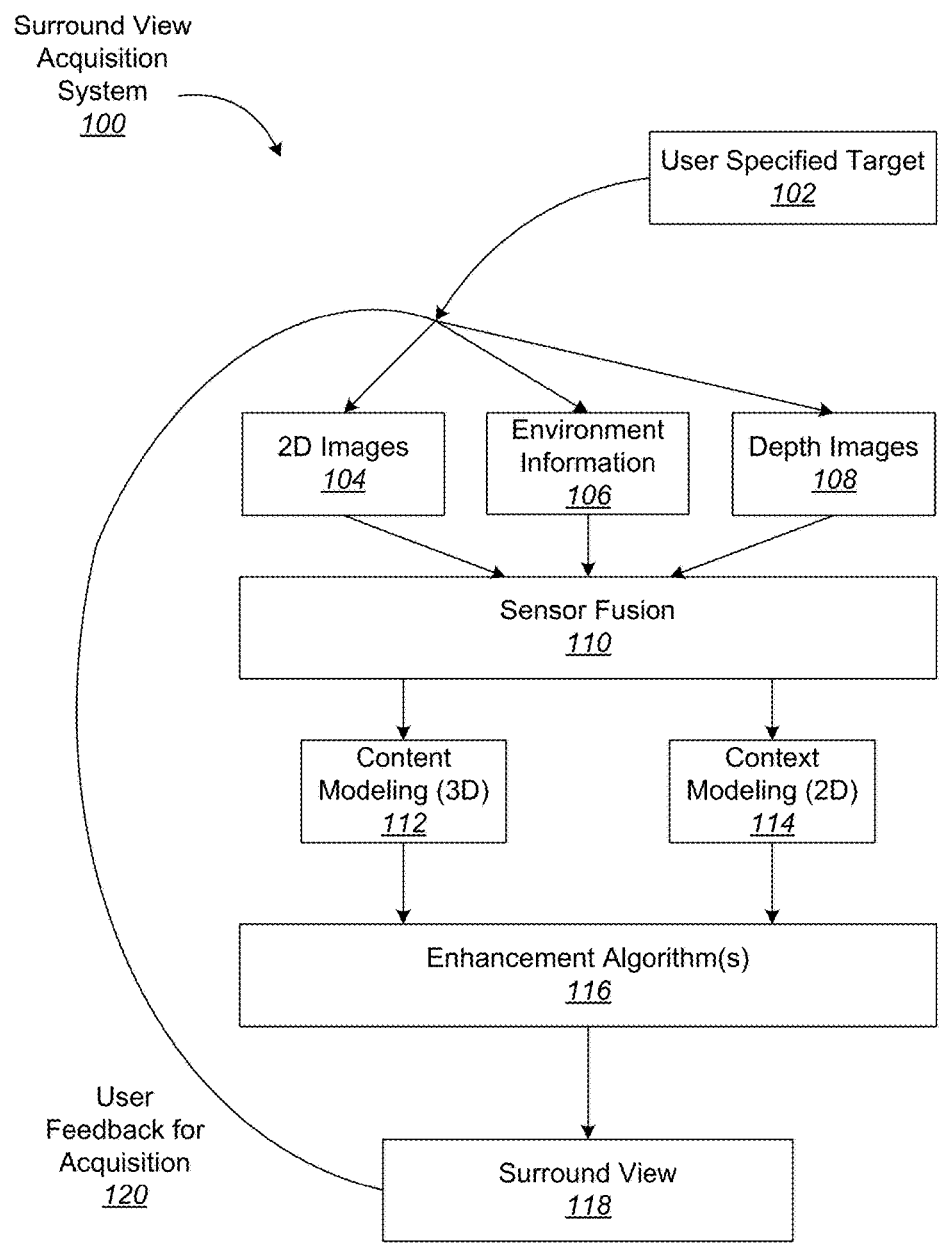
FIG. 1 illustrates an example of a surround view acquisition system.

According to various embodiments of the present invention, a surround view is a multi-view interactive digital media representation. With reference to FIG. 1, shown is one example of a surround view acquisition system 100. In the present example embodiment, the surround view acquisition system 100 is depicted in a flow sequence that can be used to generate a surround view. According to various embodiments, the data used to generate a surround view can come from a variety of sources.

In particular, data such as, but not limited to two-dimensional (2D) images 104 can be used to generate a surround view. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a surround view includes environment information 106. This environment information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, keyframes in a surround view can be stabilized for to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
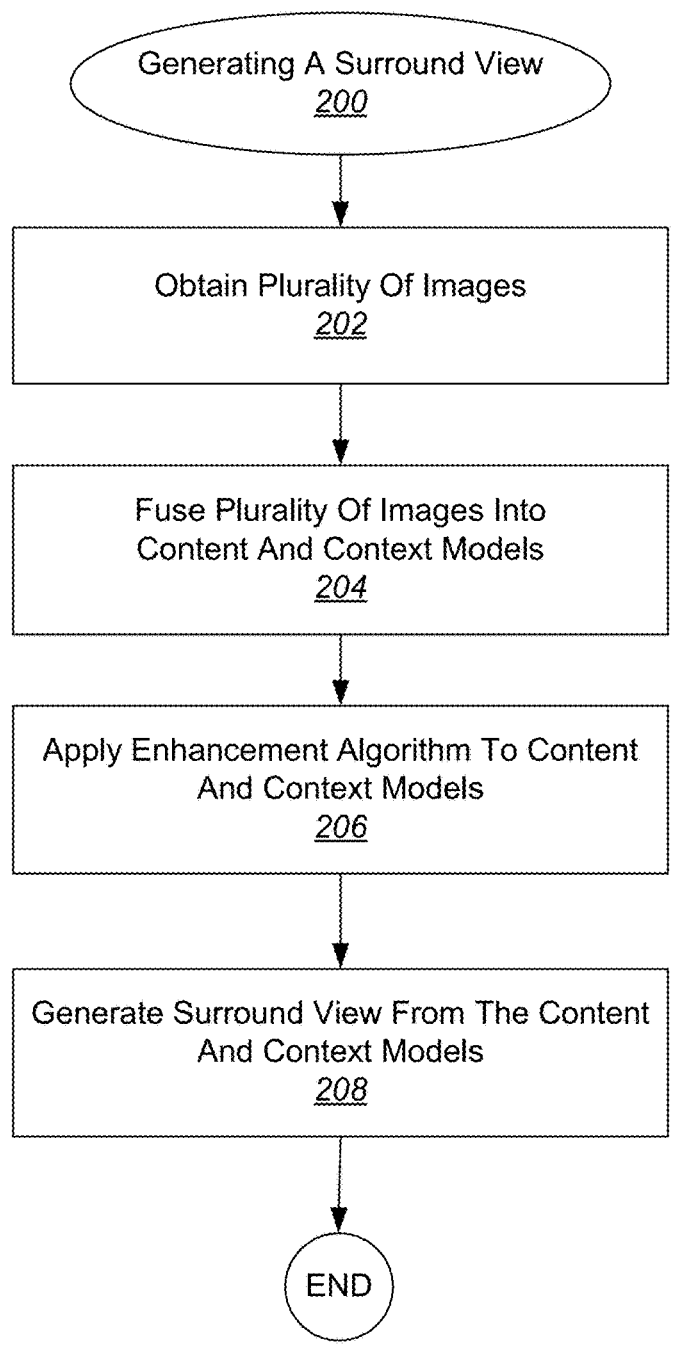
FIG. 2 illustrates an example of a process flow for generating a surround view.

With reference to FIG. 2, shown is an example of a process flow diagram for generating a surround view 200. In the present example, a plurality of images is obtained at 202. According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

As is described in more detail with respect to FIGS. 7A-11B, when the plurality of images is captured, images output to the user can be augmented with the virtual data.

For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a surround view have been captured. The virtual data may not be included in the image data captured for the purposes of generating the surround view.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 208. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application.

Figure 3:
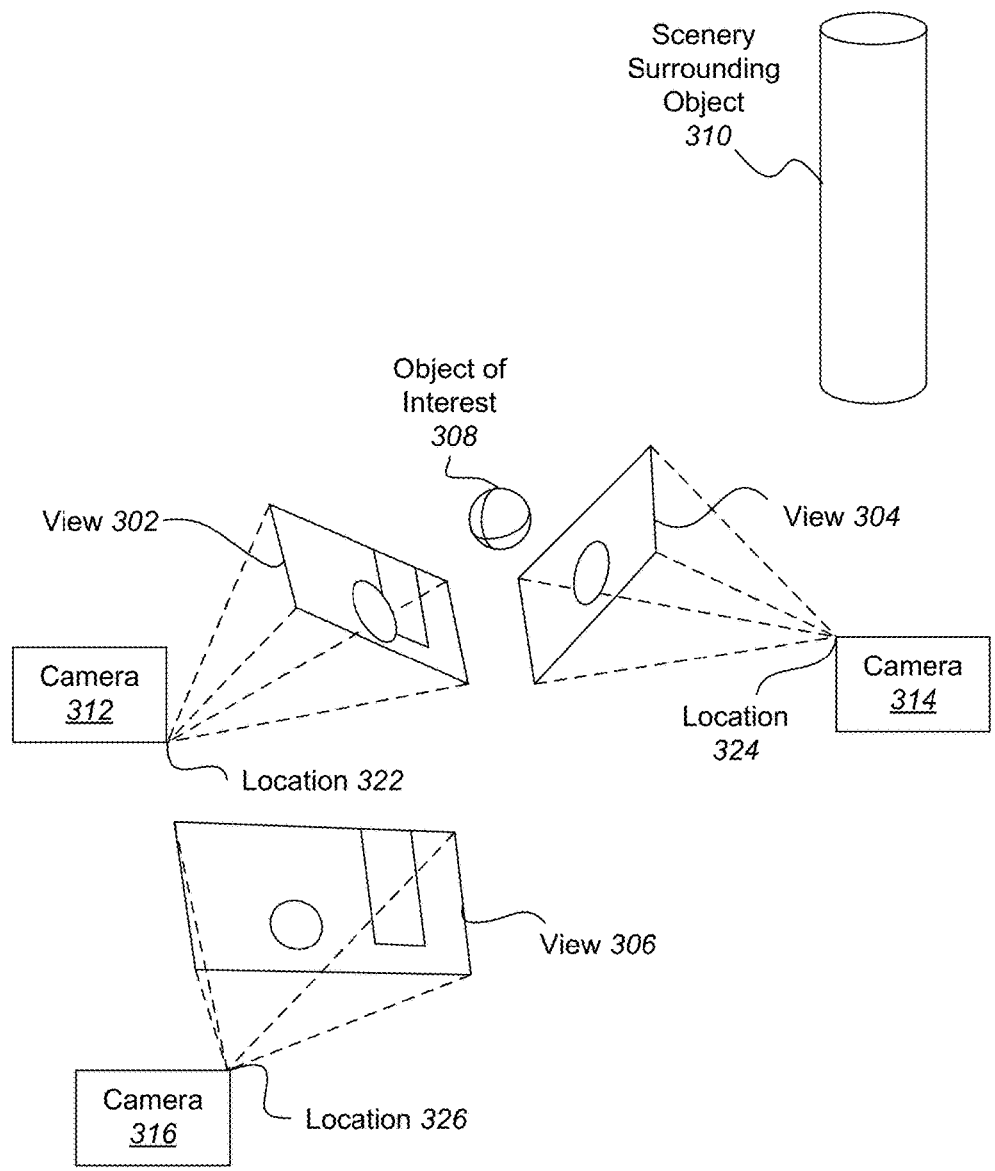
FIG. 3 illustrates one example of multiple camera views that can be fused into a three-dimensional (3D) model to create an immersive experience.

With reference to FIG. 3, shown is one example of multiple camera views that can be fused together into a three-dimensional (3D) model to create an immersive experience. According to various embodiments, multiple images can be captured from various viewpoints and fused together to provide a surround view. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce a surround view. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a surround view.

FIG. 4 illustrates one example of separation of content and context in a surround view. According to various embodiments of the present invention, a surround view is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a surround view may represent the content 404 as three-dimensional data, and the context 406 as a two-dimensional panoramic background. In other examples, a surround view may represent both the content 404 and context 406 as two-dimensional panoramic scenes. In yet other examples, content 404 and context 406 may include three-dimensional components or aspects. In particular embodiments, the way that the surround view depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6D illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view.

Figure 6A:
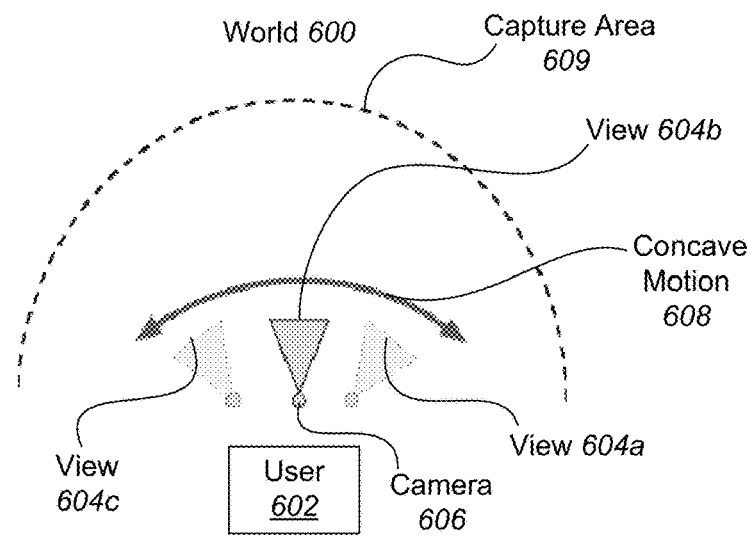
FIGS. 6A-6D illustrate examples of various capture modes for surround views.

With reference to FIG. 6A, shown is an example of a back-facing, concave surround view being captured. According to various embodiments, a locally concave surround view is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
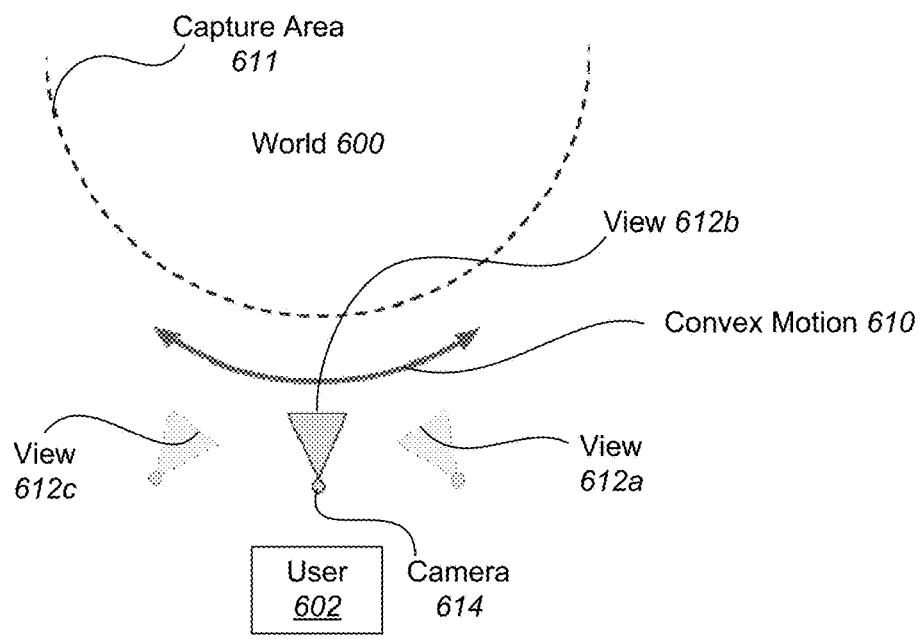

With reference to FIG. 6B, shown is an example of a back-facing, convex surround view being captured. According to various embodiments, a locally convex surround view is one in which viewing angles converge toward a single object of interest. In some examples, a locally convex surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
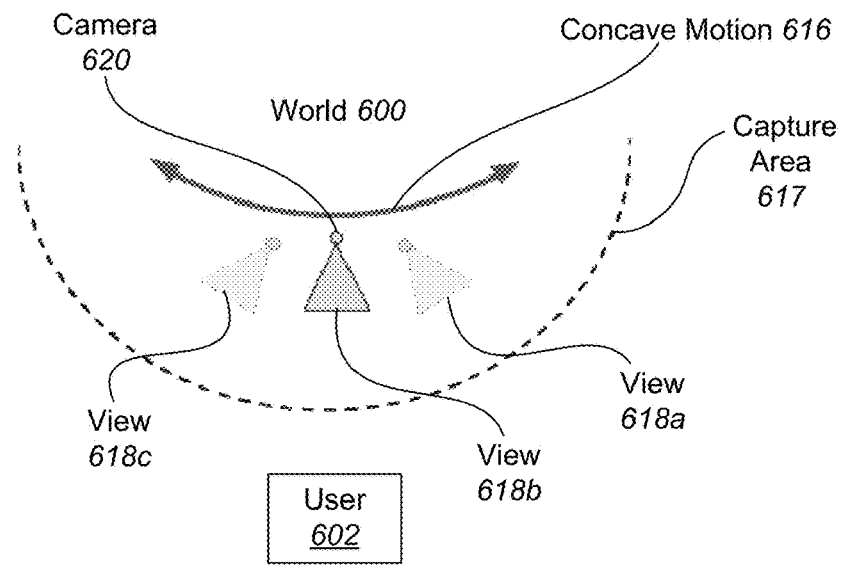

With reference to FIG. 6C, shown is an example of a front-facing, concave surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
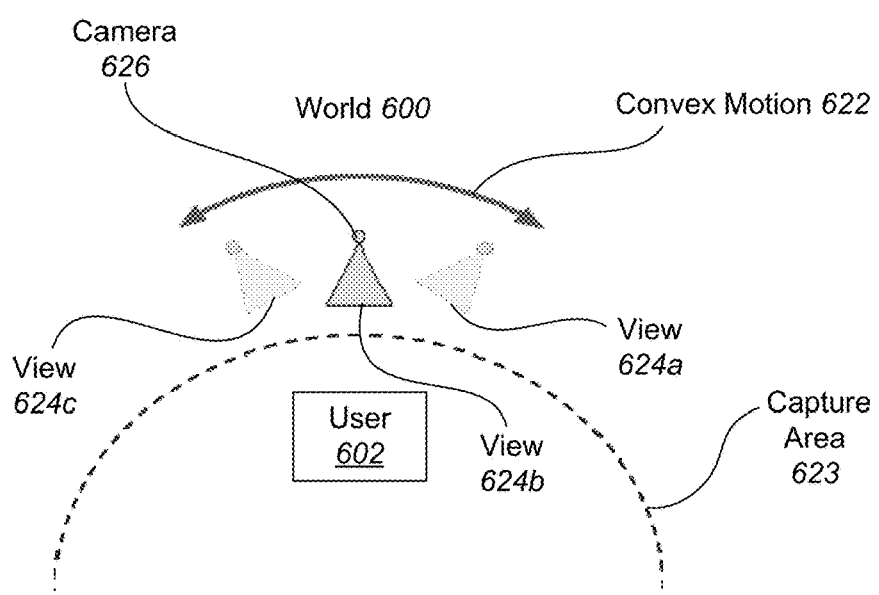

With reference to FIG. 6D, shown is an example of a front-facing, convex surround view being captured. In the present example embodiment, camera 626 is facing user 602. The camera follows a convex motion 622 such that the views 624a, 624b, and 624c converge towards the user 602. As described above, various modes can be used to capture images for a surround view. These modes, including locally concave, locally convex, and locally linear motions, can be used during capture of separate images or during continuous recording of a scene. Such recording can capture a series of images during a single session.

Next, details of an augmented reality system, which is usable in the image capture process for a surround view, is described with respect to FIG. 7A to FIG. 11B. In one embodiment, the augmented reality system can be implemented on a mobile device, such as a cell phone. In particular, the live camera data, which is output to a display on the mobile device, can be augmented with virtual objects. The virtual objects can be rendered into the live camera data. In one embodiment, the virtual objects can provide a user feedback when images are being captured for a surround view.

Figure 7A:
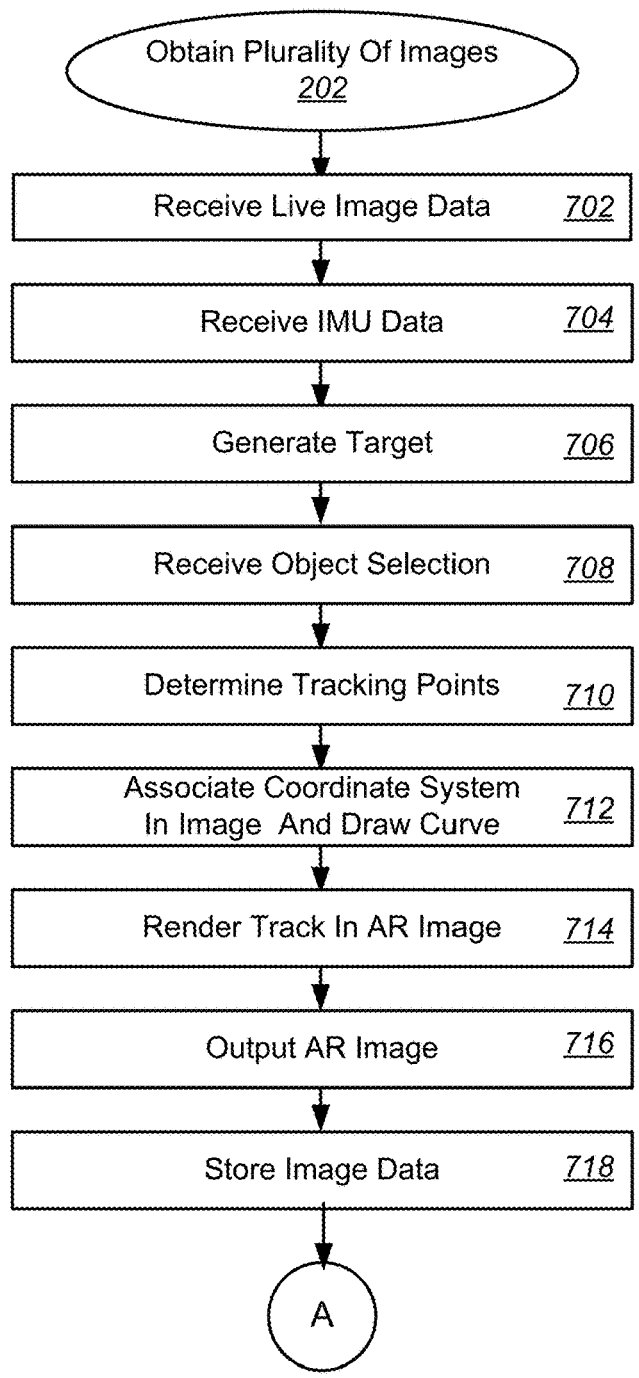
FIGS. 7A and 7B illustrate an example of a process flow for capturing images in a surround view using augmented reality.
Figure 7B:
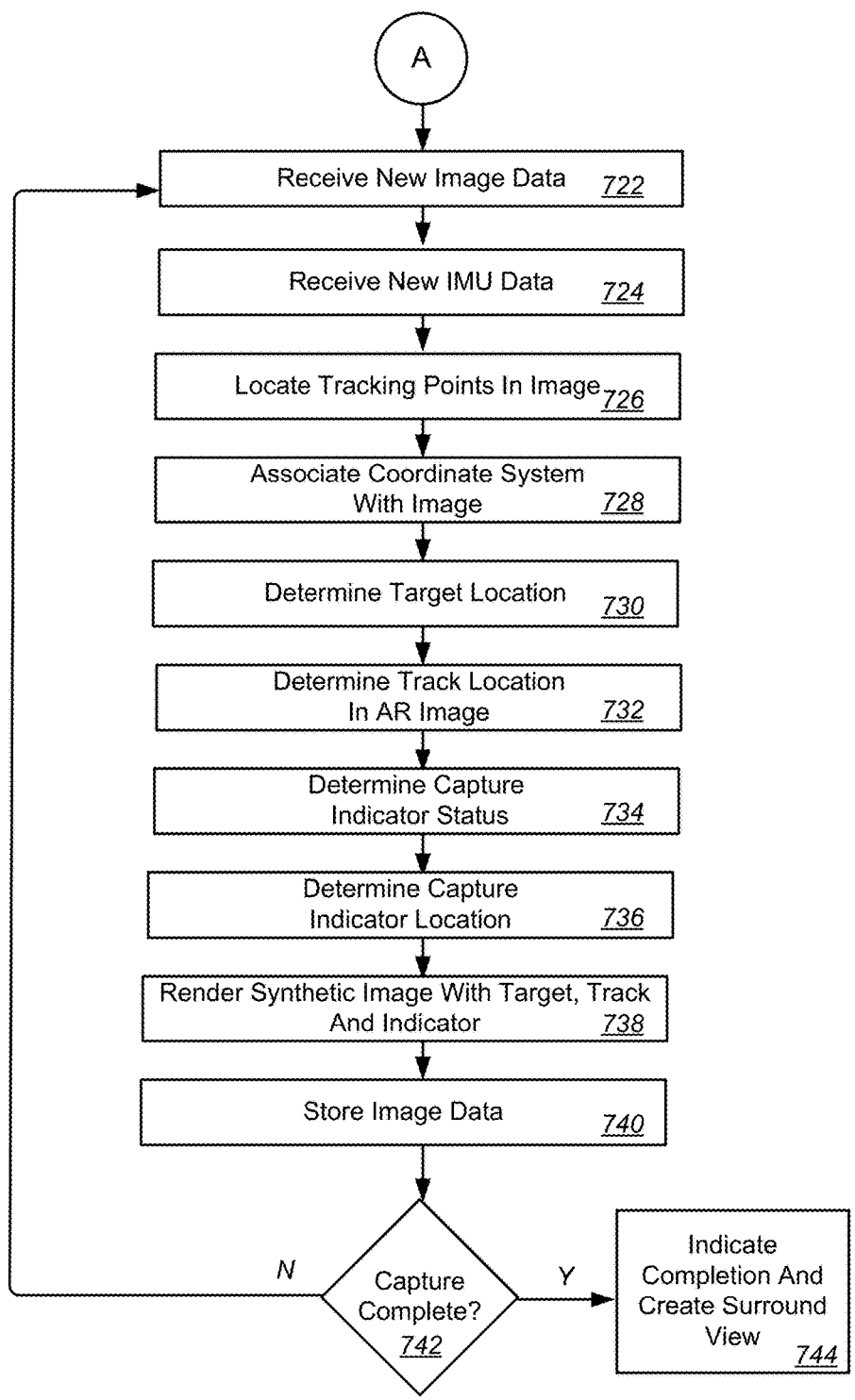

FIGS. 7A and 7B illustrate an example of a process flow for capturing images in a surround view using augmented reality. In 702, live image data can be received from a camera system. For example, live image data can be received from one or more cameras on a hand-held mobile device, such as a smartphone. The image data can include pixel data captured from a camera sensor. The pixel data varies from frame to frame. In one embodiment, the pixel data can be 2-D. In other embodiments, depth data can be included with the pixel data.

In 704, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In one embodiment, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In one embodiment, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a surround view.

Returning to FIG. 7A, in 706, virtual data associated with a target can be generated in the live image data. For example, the target can be cross hairs. In general, the target can be rendered as any shape or combinations of shapes. In one embodiment, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 708, the object selection can be received. The object selection can be used to determine an area within the image data to identify tracking points. When the area in the image data is over a target, the tracking points can be associated with an object appearing in the live image data.

In 710, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below.

In 712, a 3-D coordinate system in the physical world can be associated with the image, such as the Earth reference frame, which as described above can be related to camera reference frame associated with the 2-D pixel data. In one embodiment, the 2-D image data can be calibrated so that the associated 3-D coordinate system is anchored to the selected target such that the target is at the origin of the 3-D coordinate system.

Then, in 714, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In one embodiment, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 714, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In one embodiment, the one or more virtual object rendered into the live image data can be used to help a user capture images used to create a surround view. For example, the user can indicate a desire to create a surround view of a real object identified in the live image data. The desired surround view can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 712.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space. Further, transformations, such as projections, between image space and a 3-D coordinate system are avoided, which lowers computational costs.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 7A, in 716, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 30 frames per second can be output at 15 frames per second. In another embodiment, the AR images can be output at a reduced resolution, such as 240p instead of 480p. The reduced resolution can also be used to reduce computational requirements.

In 718, one or more images can be selected from the live image data and stored for use in a surround view. In some embodiments, the stored images can include one or more virtual objects. Thus, the virtual objects can be become part of the surround view. In other embodiments, the virtual objects are only output as part of the AR system. But, the image data which is stored for use in the surround view may not include the virtual objects.

In yet other embodiments, a portion of the virtual objects output to the display as part of the AR system can be stored. For example, the AR system can be used to render a guide during the surround view image capture process and render a label associated with the surround view. The label may be stored in the image data for the surround view. However, the guide may not be stored. To store the images without the added virtual objects, a copy may have to be made. The copy can be modified with the virtual data and then output to a display and the original stored or the original can be stored prior to its modification.

In FIG. 7B, the method in FIG. 7A is continued. In 722, new image data can be received. In 724, new IMU data (or, in general sensor data) can be received. The IMU data can represent a current orientation of the camera. In 726, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 726, a determination may be made whether a tracking point is still visible in an image. In addition, a determination may be made as to whether a new portion of the targeted object has come into view. New tracking points can be added to the new portion to allow for continued tracking of the real object from frame to frame.

In 728, a coordinate system can be associated with the image. For example, using an orientation of the camera determined from the sensor data, the pixel data can be calibrated to an Earth reference frame as previously described. In 730, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data.

In 732, a track location in the live image date can be determined. The track can be used to provide feedback associated with a position and orientation of a camera in physical space during the image capture process for a surround view. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 734, a capture indicator status can be determined. The capture indicator can be used to provide feedback in regards to what portion of the image data used in a surround view has been captured. For example, the status indicator may indicate that half of angle range of images for use in a surround view has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 736, a capture indicator location can be determined. The location can be used to render the capture indicator into the live image and generate the synthetic image. In one embodiment, the position of the capture indicator can be determined relative to a position of the real object in the image as indicated by the current set of tracking points, such as above and to left of the real object. In 738, a synthetic image, i.e., a live image augmented with virtual objects, can be generated. The synthetic image can include the target, the track and one or more status indicators at their determined locations, respectively. In 740, image data captured for the purposes of use in a surround view can be captured. As described above, the stored image data can be raw image data without virtual objects or may include virtual objects.

In 742, a check can be made as to whether images needed to generate a surround view have been captured in accordance with the selected parameters, such as a surround view spanning a desired angle range. When the capture is not complete, new image data may be received and the method may return to 722. When the capture is complete, a virtual object can be rendered into the live image data indicating the completion of the capture process for the surround view and a surround view can be created. Some virtual objects associated with the capture process may cease to be rendered. For example, once the needed images have been captured the track used to help guide the camera during the capture process may no longer be generated in the live image data.

Figure 8A:
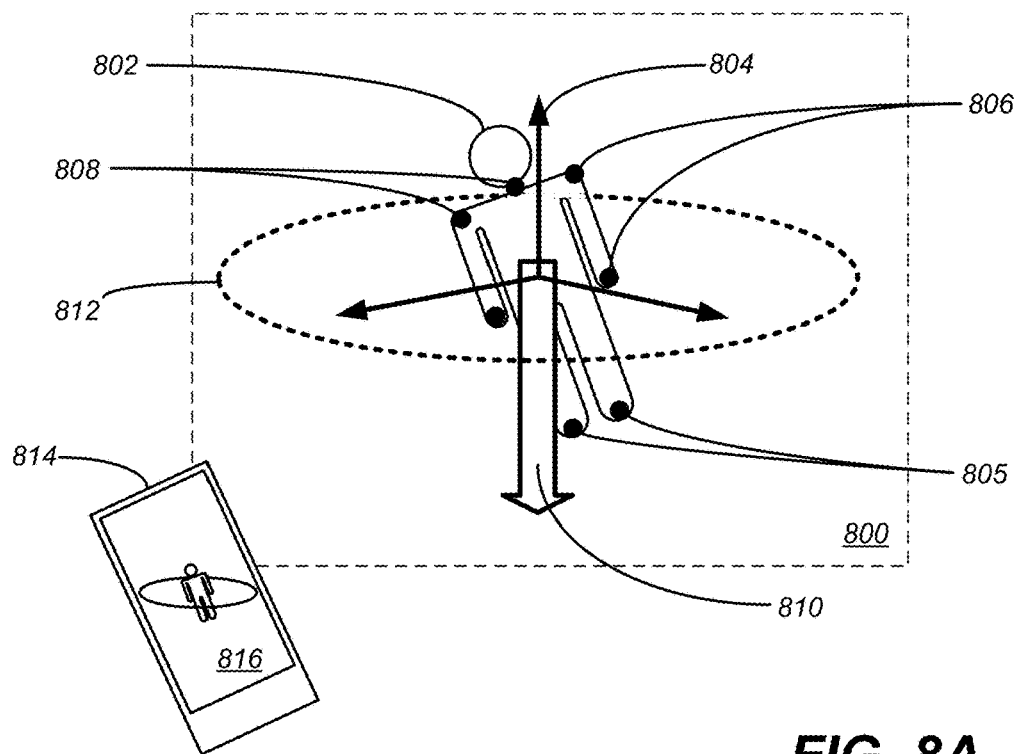
FIGS. 8A and 8B illustrate examples of generating an augmented reality image capture track for capturing images used in a surround view.
Figure 8B:
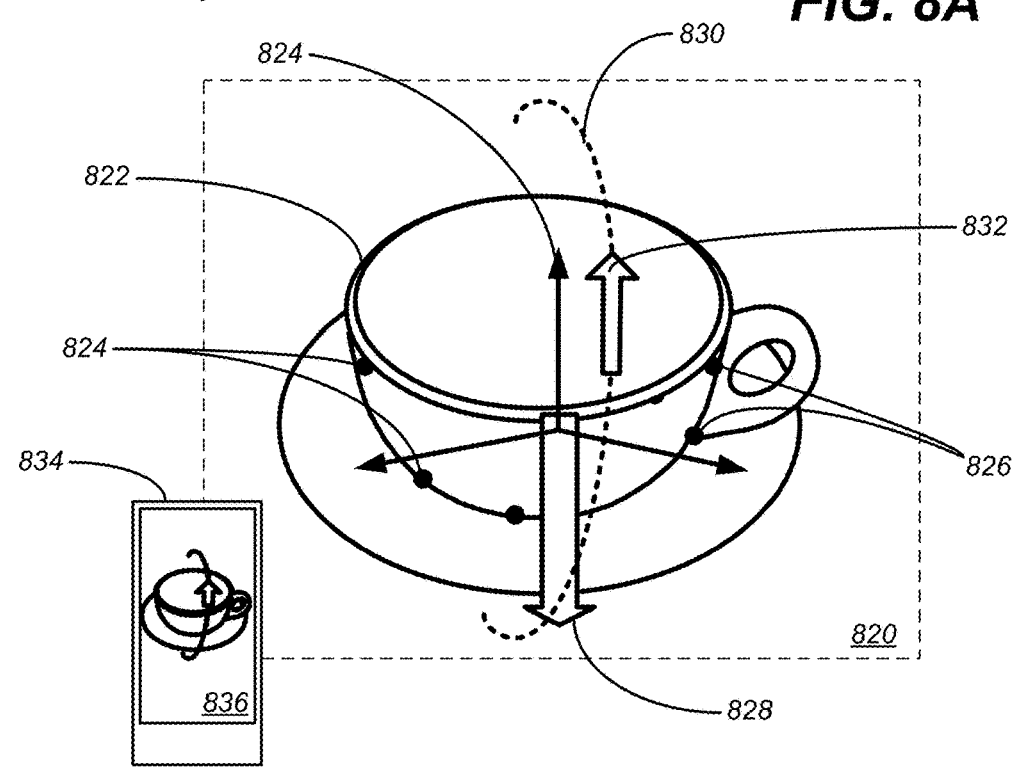

FIGS. 8A and 8B illustrate aspects of generating an Augmented Reality (AR) image capture track for capturing images used in a surround view. In FIG. 8A, a mobile device 814 with a display 816 is shown. The mobile device can include at least one camera (not shown) with a field of view 800. A real object 802, which is a person, is selected in the field of view 800 of the camera. A virtual object, which is a target (not shown), may have been used to help select the real object. For example, the target on a touch screen display of the mobile device 814 may have been placed over the object 802 and then selected.

The camera can include an image sensor which captures light in the field of view 800. The data from the image sensor can be converted to pixel data. The pixel data can be modified prior to its output on display 816 to generate a synthetic image. The modifications can include rendering virtual objects in the pixel data as part of an augmented reality (AR) system.

Using the pixel data and/or and a selection of the object 802, tracking points on the object can be determined. The tracking points can define the object in image space. Locations of a current set of tracking points, such as 805, 806 and 808, which can be attached to the object 802 are shown. As a position and orientation of the camera on the mobile device 814, the shape and position of the object 802 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 814, an Earth reference frame 3-D coordinate system 804 can be associated with the image data. The direction of the gravity vector is indicated by arrow 810. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 805, 806 and 808. Using this information, a curve, which is a circle, is drawn in the plane. The circle can be rendered into to the 2-D image data and output as part of the AR system. As is shown on display 816, the circle appears to surround the object 802. In one embodiment, the circle can be used as a guide for capturing images used in a surround view.

If the camera on the mobile device 814 is rotated in some way, such as tilted, the shape of the object will change on display 816. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 802. Thus, the curve can appear to remain parallel to the ground, i.e., perpendicular to the gravity vector, as the camera 814 moves. However, the position of the curve can move from location to location in the image as the position of the object and its apparent shape in the live images changes.

In FIG. 8B, a mobile device 834 including a camera (not shown) and a display 836 for outputting the image data is from the camera is shown. A cup 822 is shown in the field of view of camera 820 of the camera. Tracking points, such as 824 and 826, have been associated with the object 822. These tracking points can define the object 822 in image space. Using the IMU data from the mobile device 834, an Earth reference frame has been associated with the image data. As described above, in one embodiment, the pixel data can be calibrated to the Earth reference frame. The Earth reference frame is indicated by the 3-D axes 824 and the direction of the gravity vector is indicated by arrow 828.

As described above, a plane relative to the Earth reference frame can be determined. In this example, the plane is parallel to the direction of the axis associated with the gravity vector as opposed to perpendicular to the frame. This plane is used to proscribe a path for the surround view which goes over the top of the object 830. In general, any plane can be determined in the Earth reference frame and then a curve, which is used a guide, can be rendered into the selected plane.

Using the locations of the tracking points, in one embodiment, a centroid of the object 822 on the selected plane in the Earth reference can be determined. A curve 830, such as a circle, can be rendered relative to the centroid. In this example, a circle is rendered around the object 822 in the selected plane.

The curve 830 can serve as a track for guiding the camera along a particular path where the images captured along the path can be converted into a surround view. In one embodiment, a position of the camera along the path can be determined. Then, an indicator can be generated which indicates a current location of the camera along the path. In this example, current location is indicated by arrow 832.

The position of the camera along the path may not directly map to physical space, i.e., the actual position of the camera in physical space doesn't have to be necessarily determined. For example, a distance the camera has moved can be estimated from the IMU data and optionally the frame rate of the camera. The estimated distance can be mapped to a distance moved along the curve where the ratio of the distance moved along the path 830 is not a one to one ratio with the distance moved in physical space. In another example, a total time to traverse the path 830 can be estimated and then the length of time during which images have been recorded can be tracked. The ratio of the recording time to the total time can be used to indicate progress along the path 830.

The path 830, which is an arc, and arrow 832 are rendered into the live image data as virtual objects in accordance with their positions in the 3-D coordinate system associated with the live 2-D image data. The cup 822, the circle 830 and the 832 arrow are shown output to display 836. The orientation of the curve 830 and the arrow 832 shown on display 836 relative to the cup 822 can change if the orientation of the camera is changed, such as if the camera is tilted.

In particular embodiments, a size of the object 822 in the image data can be changed. For example, the size of the object can be made bigger or smaller by using a digital zoom. In another example, the size of the object can be made bigger or smaller by moving the camera, such as on mobile device 834, closer or farther away from the object 822.

When the size of the object changes, the distances between the tracking points can change, i.e., the pixel distances between the tracking points can increase or can decrease. The distance changes can be used to provide a scaling factor. In one embodiment, as the size of the object changes, the AR system can be configured to scale a size of the curve 830 and/or arrow 832. Thus, a size of the curve relative to the object can be maintained.

In another embodiment, a size of the curve can remain fixed. For example, a diameter of the curve can be related to a pixel height or width of the image, such as 80 percent of the pixel height or width. Thus, the object 822 can appear to grow or shrink as a zoom is used or a position of the camera is changed. However, the size of curve 830 in the image can remain relatively fixed.

Figure 9:
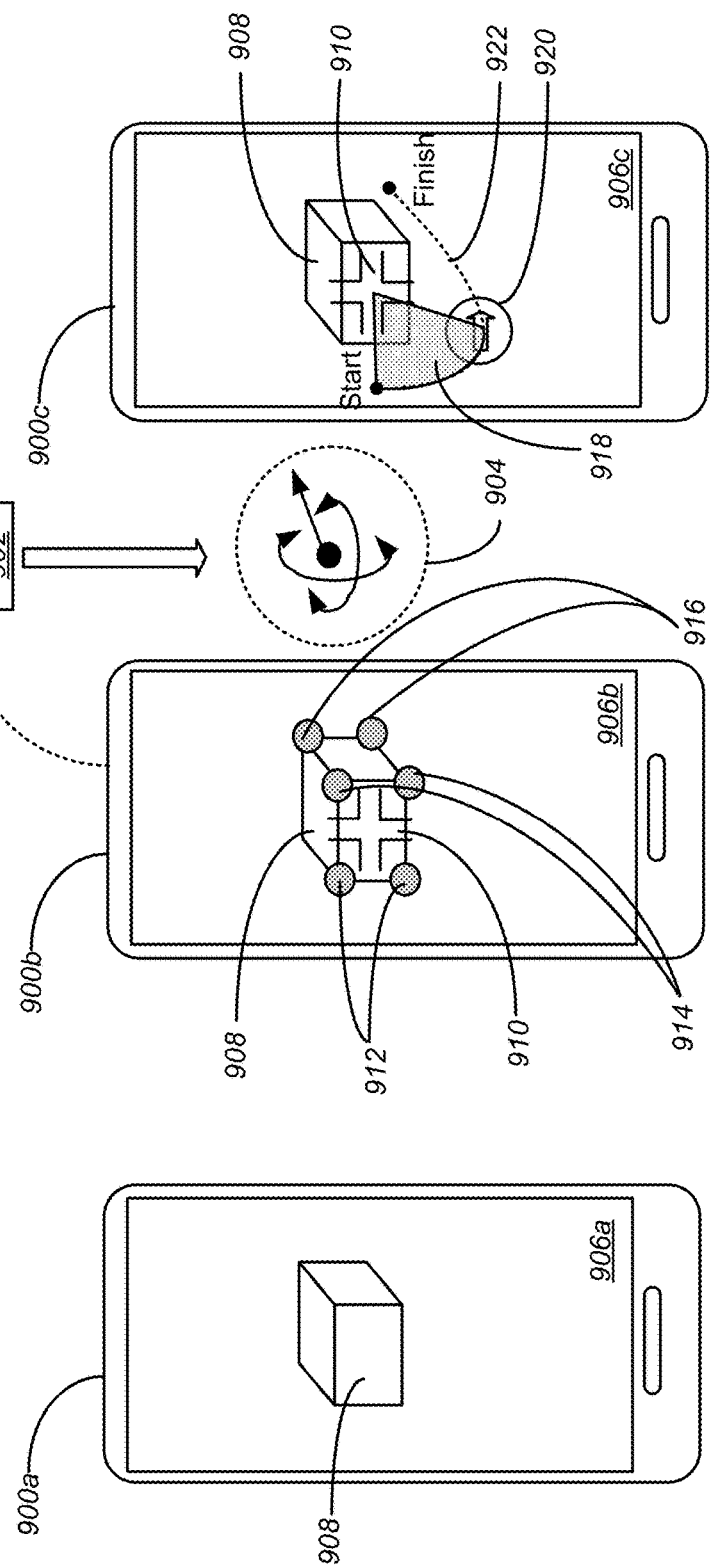
FIG. 9 illustrates an example of generating an augmented reality image capture track for capturing images used in a surround view on a mobile device.

FIG. 9 illustrates a second example of generating an Augmented Reality (AR) image capture track for capturing images used in a surround view on a mobile device. FIG. 9 includes a mobile device at three times 900a, 900b and 900c. The device can include at least one camera, a display, an IMU, a processor (CPU), memory, microphone, audio output devices, communication interfaces, a power supply, graphic processor (GPU), graphical memory and combinations thereof. The display is shown with images at three times 906a, 906b and 906c. The display can be overlaid with a touch screen.

In 906a, an image of an object 908 is output to the display in state 906a. The object is a rectangular box. The image data output to the display can be live image data from a camera on the mobile device. The camera could also be a remote camera.

In one embodiment, a target, such as 910, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 912, 914 and 916. In one embodiment, the tracking points may not appear on the display. In another embodiment, the tracking points may be rendered to the display. In one embodiment, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 904. The orientation change and current orientation of the device can be captured via the IMU data from IMU 902 on the device.

As the orientation of the device is changed, one or more of the tracking points, such as 912, 914 and 916, can be occluded. In addition, the shape of surfaces currently appearing in the image can change. Based on changes between frames, movement at various pixel locations can be determined. Using the IMU data and the determined movement at the various pixel locations, surfaces associated with the object 908 can be predicted. The new surfaces can be appearing in the image as the position of the camera changes. New tracking points can be added to these surfaces.

As described above, the mobile device can be used to capture images used in a surround view. To aid in the capture, the live image data can be augmented with a track or other guides to help the user move the mobile device correctly. The track can include indicators that provide feedback to a user while images associated with a surround view are being recorded. In 906c, the live image data is augmented with a path 922. The beginning and end of the path is indicated by the text, "start" and "finish." The distance along the path is indicated by shaded region 918.

The circle with the arrow 920 is used to indicate a location on the path. In one embodiment, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the surround view. Colors or other indicators can be used to indicate the status. For example, the arrow and/or circle can be rendered green when the mobile device is properly following the path and red when the position/orientation of the camera relative to the object is less than optimal.

Figure 10A:
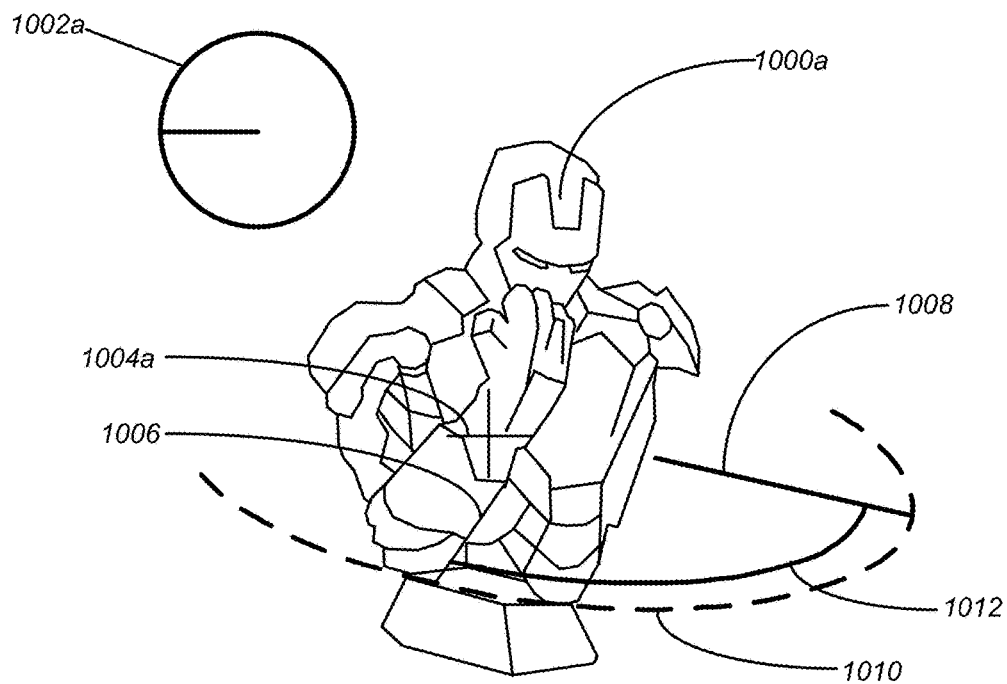
FIGS. 10A and 10B illustrate an example of generating an augmented reality image capture track including status indicators for capturing images used in a surround view.
Figure 10B:
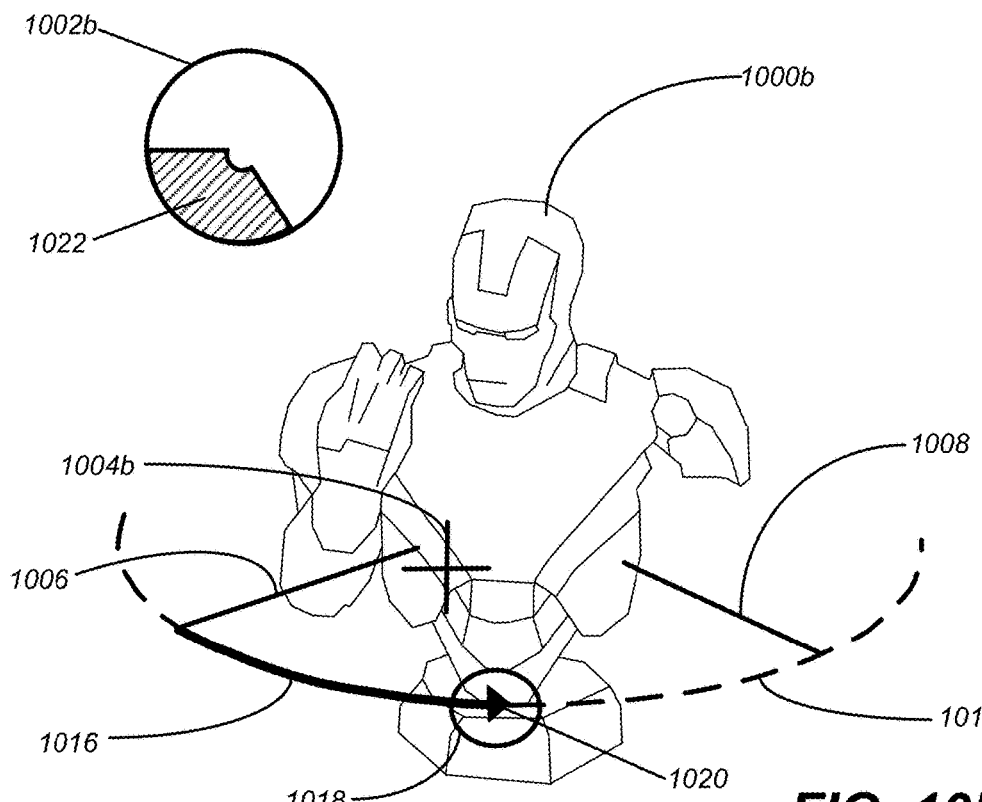

FIGS. 10A and 10B illustrate yet another an example of generating an Augmented Reality (AR) image capture track including status indicators for capturing images used in a surround view. The synthetic image generated by the AR system can consist of live image data from a camera augmented with one or more virtual objects. For example, as described above, the live image data can be from a camera on a mobile device.

In FIG. 10A, an object 1000a, which is a statue, is shown in an image 1015 from a camera at a first position and orientation. The object 1000a can be selected via the cross hairs 1004a. Once the cross hairs are placed on the object and the object is selected, the cross hairs can move and remain on the object as the object 1000a moves in the image data. As described above, as an object's position/orientation changes in an image, a location to place the cross hairs in an image can be determined. In one embodiment, the position of the cross hairs can be determined via tracking the movements of points in the image, i.e., the tracking points.

In particular embodiments, if another object is moved in front of a tracked object, it may not possible to associate the target 1004a with the object. For example, if a person moves in front of the camera, a hand is passed in front of the camera or the camera is moved so the object no longer appears in the camera field of view, then the object which is being tracked will no longer be visible. Hence, it may not be possible to determine a location for the target associated with the tracked object. In the instance where the object reappears in the image, such as if a person that blocked the view of the object moved into and out of the object, then the system can be configured to reacquire the tracking points and reposition the target.

A first virtual object is rendered as indicator 1002a. Indicator 1002a can be used to indicate the progress in capturing images for a surround view. A second virtual object is rendered as curve 1010. Third and fourth virtual objects are rendered as lines 1006 and 1008. A fifth virtual object is rendered as curve 1012.

The curve 1010 can be used to depict a path of a camera. Whereas lines 1006 and 1008 and curve 1012 can be used to indicate an angle range for the surround view. In this example, the angle range is about ninety degrees.

In FIG. 10B, the position of the camera is different as compared to FIG. 10A. Hence, a different view of object 1000b is presented in image 1025. In particular, the camera view shows more of a front an object as compared to the view in FIG. 10A. The target 1004b is still affixed to the object 1000b. However, the target is fixed in a different location on the object, i.e., on a front surface as opposed to an arm.

The curve 1016 with arrow 1020 at the end is used to indicate the progress of the image capture along curve 1010. The circle 1018 around the arrow 1020 further highlights the current position of the arrow. As described above, a position and a direction of the arrow 1020 can be used to provide feedback to a user on a deviation of the camera position and/or orientation from curve 1010. Based upon this information, the user may adjust a position and/or orientation of the camera while it is capturing the image data.

Lines 1006 and 1008 still appear in the image but are positioned differently relative to object 1000b. The lines again indicate an angle range. In 1020, the arrow is about half way between lines 1006 and 1008. Hence, an angle of about 45 degrees has been captured around the object 1000b.

The indicator 1002b now includes a shaded region 1022. The shaded region can indicate a portion of a surround view angle range currently captured. In one embodiment, lines 1006 and 1008 can only indicate a portion of the angle range in a surround view that is being captured and the total angle range can be shown via indicator 1002b. In this example, the angle range shown by indicator 1002b is three hundred sixty degrees while lines 1006 and 1008 show a portion of this range which ninety degrees.

Figure 11A:
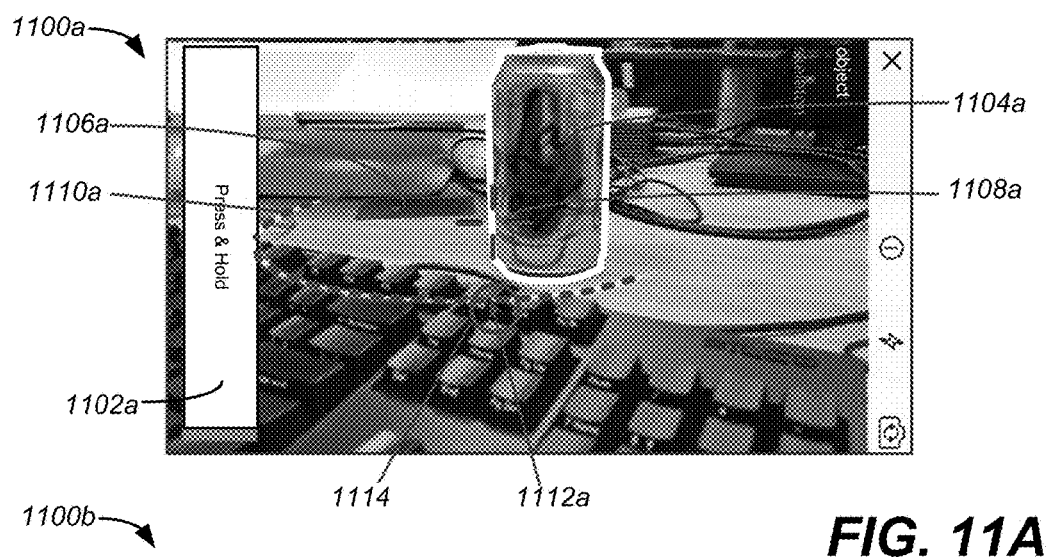
FIGS. 11A and 11B illustrate an example of generating an augmented reality image capture track including camera tilt effects on a mobile device.
Figure 11B:
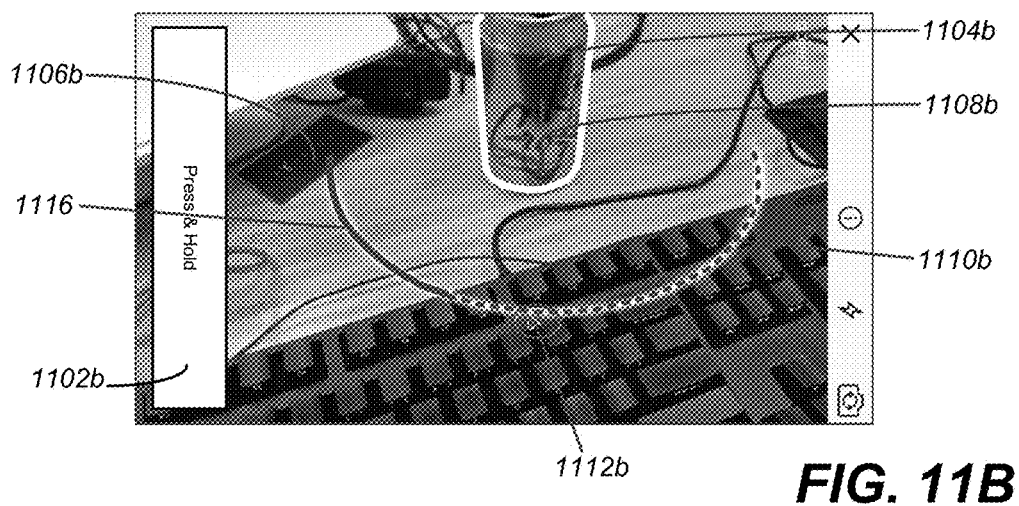

FIGS. 11A and 11B illustrate a yet further example of generating an Augmented Reality (AR) image capture track. In FIGS. 11A and 11B, images are shown on a display of a mobile device. The images 1100a and 1100b are at two different times and two different positions and orientations of a camera on a mobile device. Images 1100a and 1100b are synthetic images combining live image data and virtual objects. The images are rendered as if appearing on a display of a mobile device.

In 1100a, a target 1108a has been used to select object 1104a, which is a can. The target 1108 is affixed to the object 1104a. A guide 1110a, which consists of an arc 1110a, is rendered in the image. A button 1102a is also rendered. The button includes the text "Press & Hold." When the touch screen is touched over button 1102a, an image capture for a surround view can be initiated.

A circle 1114 with an arrow 1112a is shown in the image. In one embodiment, these indicators can indicate progress along the guide 1110a where the progress is associated with capturing images for the surround view. In another embodiment, these indicators can indicate whether images for the surround view are currently being captured.

The guide 1110 is rendered in a plane normal to the gravity vector, which is approximately parallel to a table on which the can 1104a is resting. A number of objects are also in the image, such as the card 1106a, the keyboard and various cords. Since they are resting on the table, these objects also reside in a plane normal to the gravity vector.

In 1100b, the camera is positioned higher above the can 1104b as compared to 1100a. The higher position of the camera is illustrated by the shape of the can 1104b and the shape of the card 1106b in the image. The target 1108b is still affixed to the object 1104b. However, it is now at a different position on the object. The curve 1110b is again rendered in the image as if it were in a plane parallel to the gravity vector. In this plane, the curve is centered approximately around a position of the target 1108b.

In 1100b, the button 1102b is being held and capture of images for a surround view have been initiated. The curve 1110b includes a solid portion 1116. The solid portion indicates a progress of the surround view capture. The arrow 1112b includes an extra line at the top. In this example, the extra line indicates that images for the surround view are being captured and not progress along path 1110b.

Next, additional details related to generating augmented reality images using tracking points is described with respect to FIGS. 12A-14. In particular, the projection of a 2-D/3-D model into a 2-D image space is described where the placement of the 3-D in the 2-D image can be related to points tracked in the 2-D live image. Further details of projections of 2-D/3-D models into image space and the generation of surround views, which can be used herein, are described with respect to U.S. patent application Ser. No. 15/009,807, filed Jan. 28, 2016, by Holzer, et al. and titled "Augmenting Multi-View Image Data with Synthetic Objects Using IMU and Image Data," which claims the benefit of U.S. provisional application No. 62/242,932, filed Oct. 16, 2015, each of which is incorporated by reference herein for all intents and purposes.

Figure 12A:
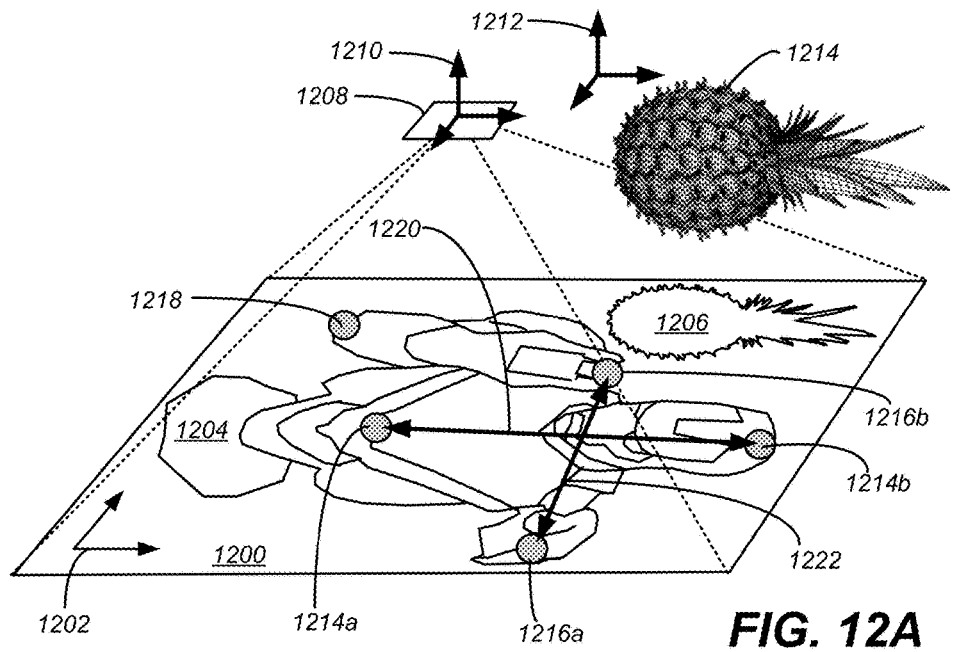
FIGS. 12A-12D illustrate an example of generating an augmented reality image using tracking points on a mobile device.

FIGS. 12A-12D illustrate an example of generating an augmented reality image 1200 using tracking points on a mobile device. In FIG. 12A, live image data is generated from a camera system 1208. The position of the camera lens in space in the camera system can be measured by an IMU. In one embodiment, as described above, the IMU can provide an orientation of the camera lens relative to the gravity vector. This coordinate system of the camera lens is indicated by the axes 1210.

The live image data includes an object 1204, which is a statue. The object can be defined by a plurality of pixels in the image space. The image space is a 2-D array of pixels. The axes 1202 represent a coordinate system for the image space. Image 2000 includes live image data, i.e., statue 1204 and synthetic objects, such as 1206.

In particular embodiments, one or more 2-D or 3-D synthetic objects can be modeled. The axes 1212 represent a coordinate system for the synthetic object. In this example, a single synthetic object, which is a pineapple 1214, is modeled in 3-D. The object 1204, which is part of the live image data, is not modeled in the model space associated with axes 1212.

An orientation of the axes 1212 in the model space can be specified relative to the image space 1202. The orientation can be used to generate a projection from model space to image space. Further, an orientation of a 3-D object, such as the model of the pineapple 1214 can be specified in model space. The orientation of a synthetic object in model space can affect how the synthetic object is projected into image space.

In one embodiment, a system can be configured to receive an input which allows an initial orientation of a 2-D synthetic object or a synthetic 3-D object to be specified in the model space. For example, the input can be used to rotate and/or translate the object 1214 in model space. With the orientation of the synthetic object in model space specified and the orientation of the model space coordinate system relative to the image space coordinate system known, a representation in of the synthetic object modeled in the 3-D model space can be projected into the 2-D image space associated with axes 1202 to generate a synthetic image.

Figure 12B:
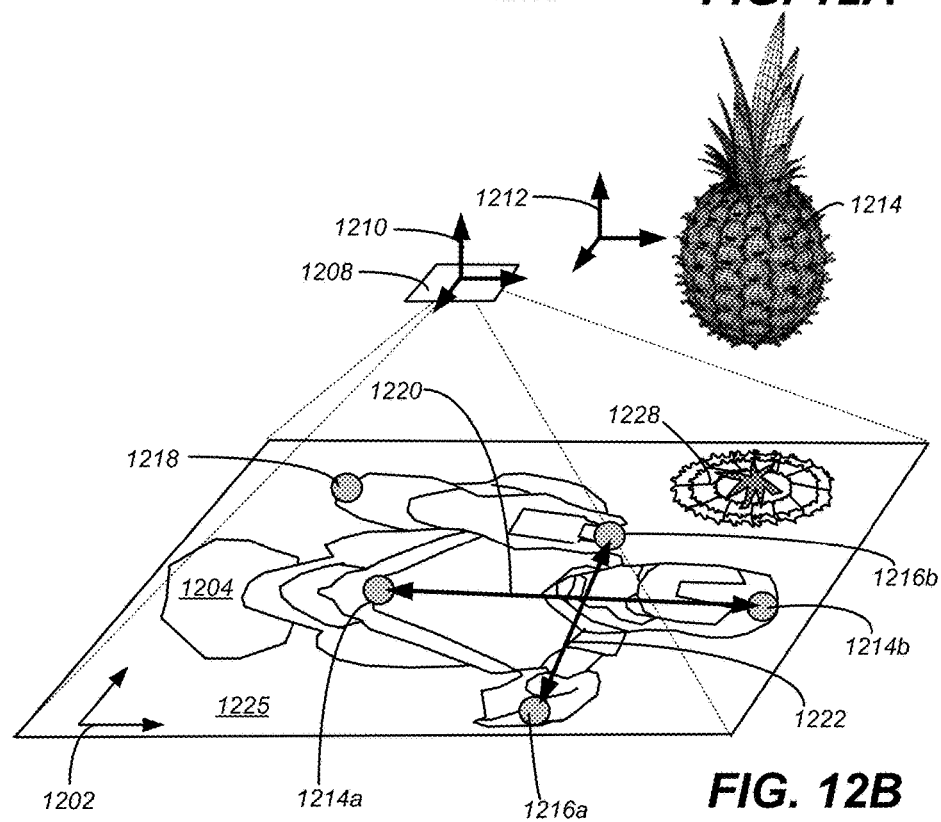
Figure 12C:
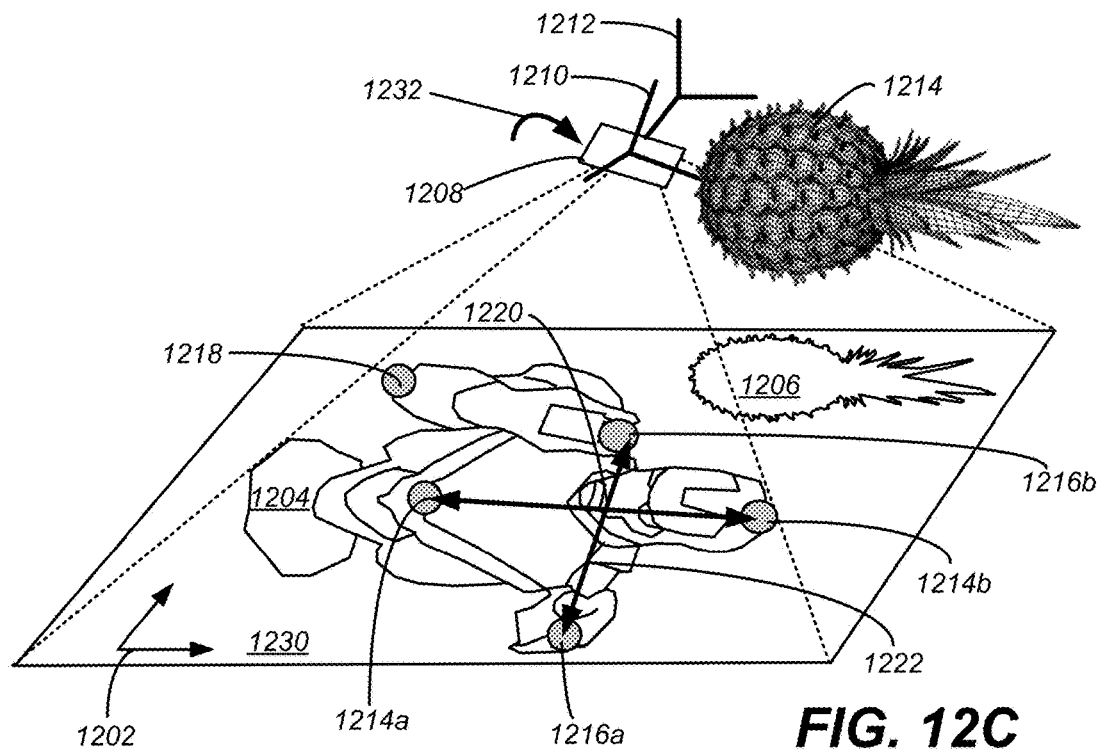
Figure 12D:
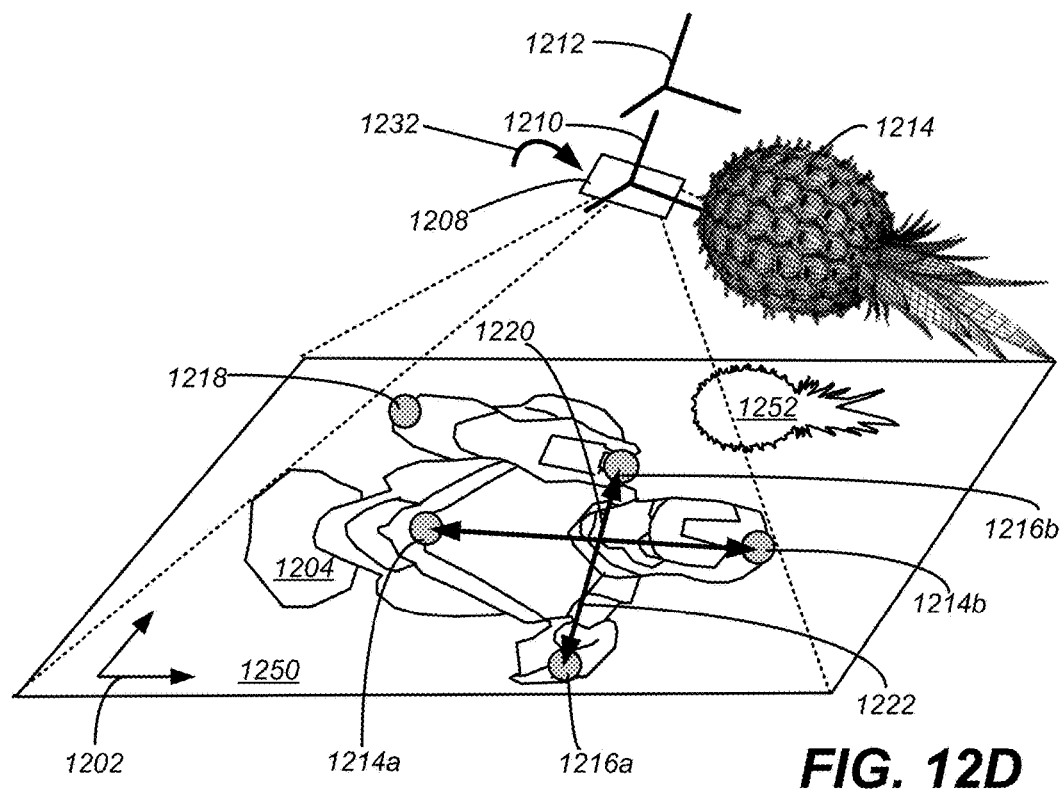

As described above, the projection of the synthetic object into image space can depend on the initial orientation of the object in model space. For example, in FIG. 12A, the 3-D model of the pineapple 1224 is shown on its side in the model space and it is projected into image space as being on its side 1206 in the synthetic image 1200. In FIG. 12B, the model 1214 of the pineapple is shown in an upright orientation and it is projected into image space in an upright 2-D orientation 1228 into the synthetic image 1225.

In alternate embodiments, a transformation can be specified between the coordinate system in model space and the coordinate system in image space. The transformation may result in a rotation and/or translation of the synthetic object, such as 1214, when it is projected from model space to image space. For example, in FIG. 12A, the orientation of pineapple 1214 in model space can be projected into image space 1202 as image 1228 in FIG. 12B. As another example, in FIG. 12B, the orientation of pineapple 1226 in model space can be projection into image space 1202 as image 1206. In both of these cases, a rotation is applied during the projection from model space to image space. In general, a transformation between model space and image space can involve translations and/or rotations.

In FIG. 12A, after the projection from model space to image space, only an outline 1206 of the pineapple is shown in the synthetic image 1200. In other embodiments, the representation of the 2-D or 3-D synthetic object projected into image space can be rendered with a texture, such as texture consistent with a pineapple for object 1214. For example, in FIG. 12B, image 1228 is rendered with a texture. In some embodiments, a user may be able to specify a texture to use with the projection of an object, such as a particular solid color or a pattern.

The synthetic object that is rendered from model space to image space can be rendered to a particular position in image space. In one embodiment, the synthetic object can be rendered to a fixed location in image space 1202. For example, the synthetic object can be rendered relative to some fixed point in image space that doesn't change when the camera in the camera system is moved. This point in image space may remain constant even if the camera in the camera system is translated or rotated.

In another embodiment, the synthetic object can be rendered in image space relative to one or more tracked points or tracked areas in space where the position of the tracked points or tracked areas can change as a function of time. As described above, the system may allow a user to select an object or an area in image space 1202 that is to be associated with one or more tracking points. The selection can be used to determine an initial position of the tracking points in the image associated with the selected object.

As the position of camera 1208 changes, a position of a selected object in the image space can change. Thus, the location of the one or more tracking points associated with the selected object can change in image space. Therefore, the location where the synthetic object is rendered in image space can also change.

For example, five tracking points, 1214a, 1214b, 1216a, 1216b and 1218 are shown associated with object 1204 in the live image data. When camera 1208 is tilted and/or translated, such as shown by motion 1232 in FIG. 12D, the position of the tracking points 1214a, 1214b, 1216a and 1216b move downward. In response, the pineapple 1214 is rendered as image 1252 in image space at a location that moves downward as compared to the location in FIG. 12A. In general, as a camera moves and a tracking point moves around in an image, a synthetic object can be configured to move in a direction associated with the direction the tracking point has moved.

In particular embodiments, a distance between tracking points can be tracked. For example, a distance 1222 is shown between points 1216a and 1216b and a distance 1220 is shown between tracking points 1214a and 1214b. The distances between tracking points can change from image to image as a position of a camera that generates the live image data changes. Further, the distances which are measured may also change as some tracking points are removed and new tracking points are added. In one embodiment, the changes in distances measured between tracking points may not affect how synthetic object is rendered. For example, in FIG. 12C, the distance 1220 between tracking points 1214a and 1214b is smaller as compared to FIG. 12A. However, the pineapple 1214 is rendered in the same way in both synthetic images 1200 and 1230.

In another embodiment, the changes in distances measured between tracking points affects how the synthetic object is rendered. For example, in FIG. 12D, the distance 1220 between tracking points 1214a and 1214b in synthetic image 1250 is smaller as compared to image 1200 in FIG. 12A. In response, the pineapple 1214 is compressed in a vertical direction when it is rendered into the image space. In various embodiments, a scaling factor used in rendering can be derived from the change in distances. For example, a ratio of distance 1220 in FIG. 12A relative to distance 1220 in FIG. 12D can be used to determine how much the synthetic object is scaled when it is rendered from model space into image space.

In yet other embodiments, distances measured in multiple directions can be used to control scaling of objects from model space in different directions. For example, when object 1214 is projected from model space to image space, distance 1220 can be used to control scaling in the horizontal direction and distance 1222 can be used to control scaling in the vertical direction. Between FIGS. 12A and 12D, distance 1220 is reduced whereas distance 1222 is about the same. Hence, in FIG. 12D, the model object 1214 is scaled in the vertical direction. However, it is not scaled in the horizontal direction.

In various embodiments, multiple changes in distances between pairs of tracking points can be measured and averaged. For example, a horizontal change in distance between point 1214a and 1218 can be determined from frame to frame in the live image data and a horizontal change in distance between points 1216a and 1216b can be measured. Then, based upon the two measurements, an average change in distance in one or more directions can be determined to determine a scaling factor to use during a rendering process.

In various embodiments, a motion of the camera system 1208 can affect how an object appears in an image. For example, in FIG. 12C, the rotation and translation 1232 of the camera system 1208 causes the statue 1204 to appear smaller in image 1230 as compared to image 1200 in FIG. 12A. The image appears smaller because the camera is moving over the top of the object 1204 in physical space and also rotating downwards in physical space. As described above, the camera motion can be directed using a track or guides as part of an image capture process used to generate a surround view.

In particular embodiments, an IMU can be used to determine a rotation and/or translation of a camera system. For example, in FIG. 12C, an IMU can be used to determine a rotation and translation 1232 of camera system 1208. The IMU can provide information about a current angle orientation of the camera lens and/or an amount the camera lens has translated as a function of time (also, from frame to frame). The current angle orientation in a current frame can be compared to a previous angle orientation of the camera lens in a previous frame to determine how much rotation has occurred.

In one embodiment, an amount of rotation measured by the IMU can be used to determine a change in orientation of a model object in model space. For example, in FIG. 12D, the camera system 1208 goes through a rotation and/a translation 1232, in response, the object 1214 is also rotated in model space (But, not translated in this example). Then, based upon the rotation, the model 1214 is projected from model space to image space to provide the synthetic object 1252 in the synthetic image 1250.

In various embodiments, in response to a rotation change and/or translation change determined from the IMU or some other measurement system, the model in model space may not be rotated, may be only rotated, may be only translated or may be rotated and translated. The amount of rotation or translation applied to the model doesn't have to correspond in a one to one manner to the measured amount rotation or translation change. For example, based upon a measured rotational change, the amount of rotation applied to the model in model space can be some value less than or more than the measured rotational change. Further, the value which is applied can be a function that varies with the value of the measured rotational change. Similarly, based upon a measured translational change, the translation applied in model space can be a fraction or a multiple of the measured change as well as vary as a function the measured translational change.

Figure 13A:
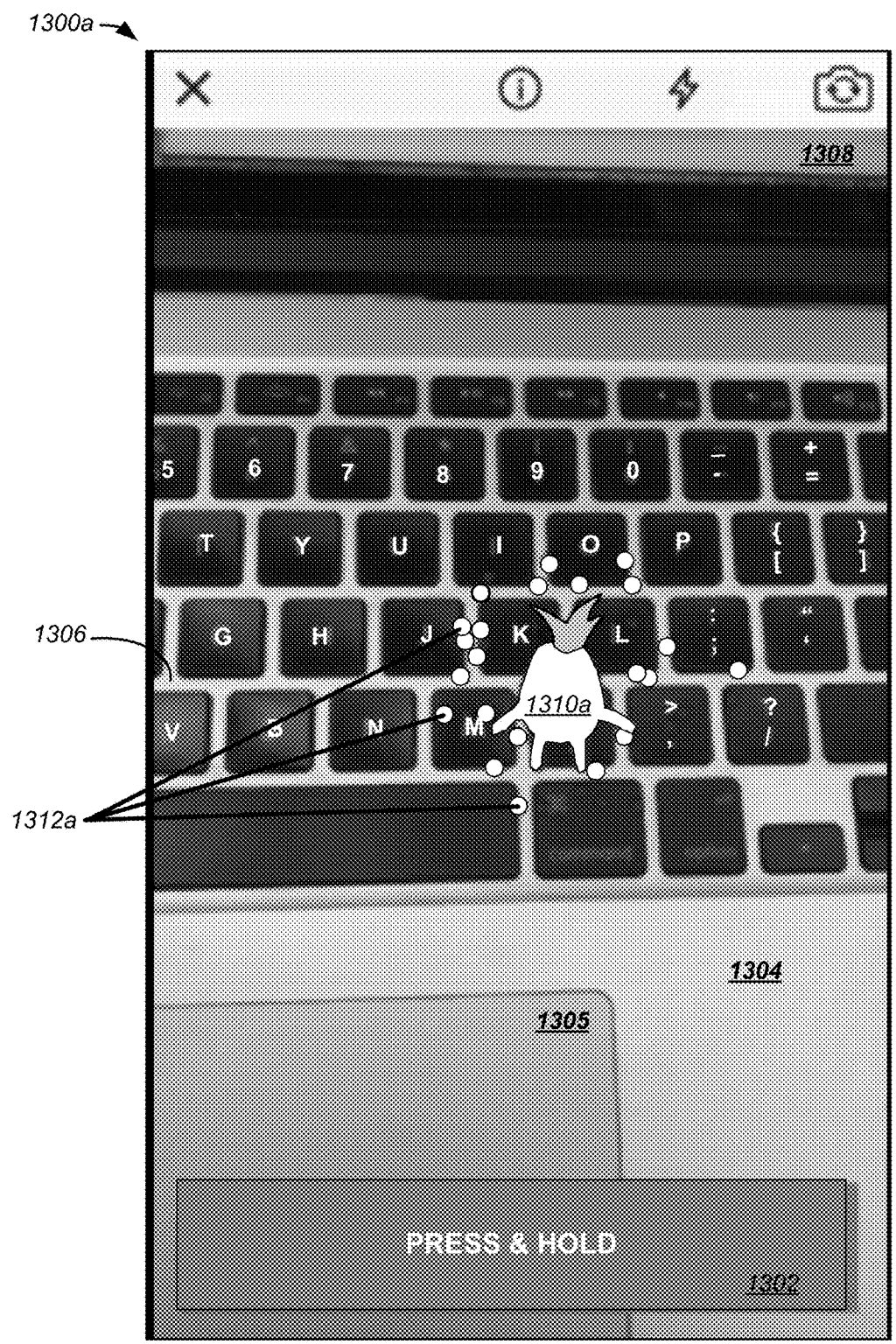
FIGS. 13A-13C illustrate an example of generating an augmented reality image using tracking points on a mobile device.
Figure 13B:
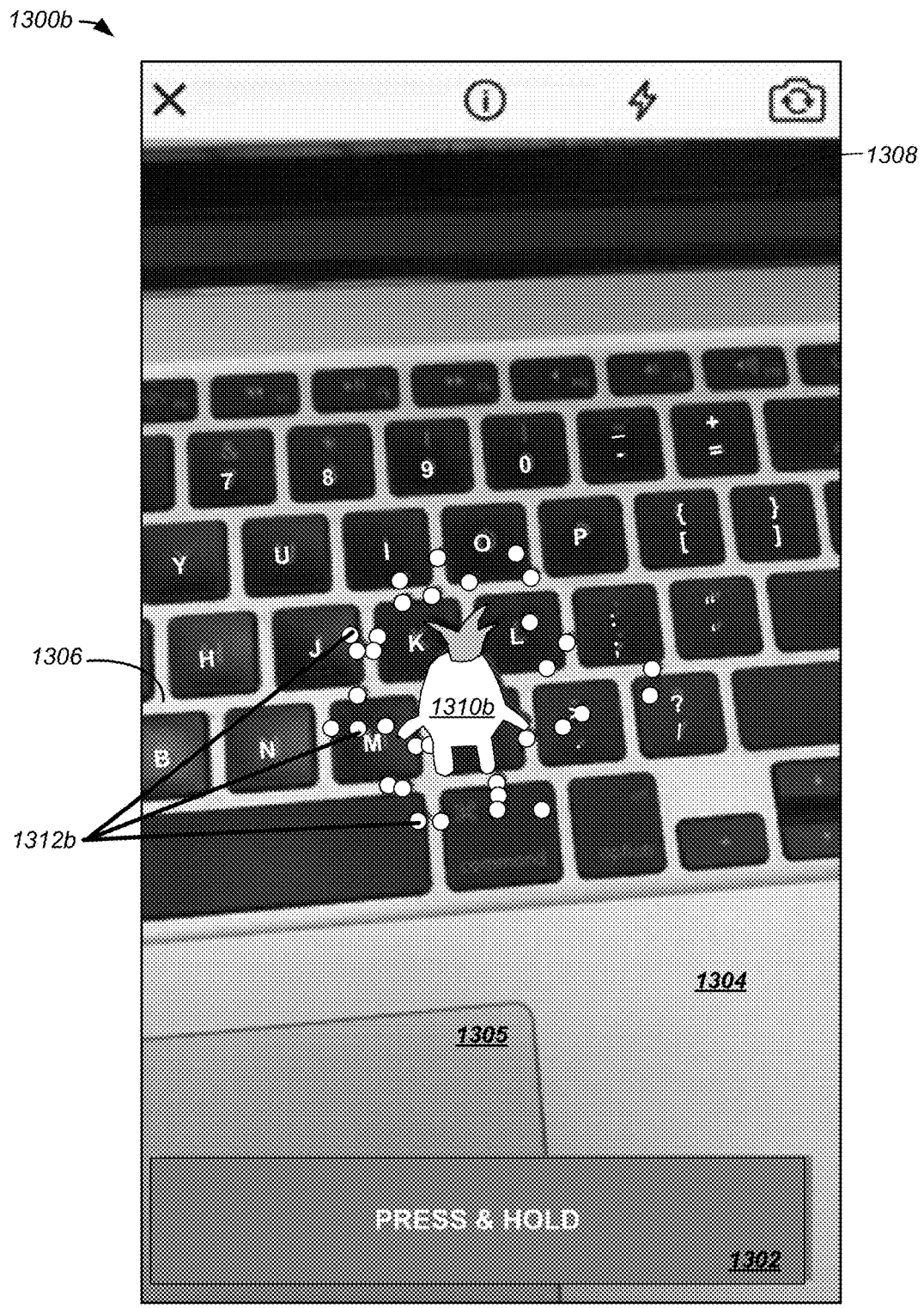
Figure 13C:
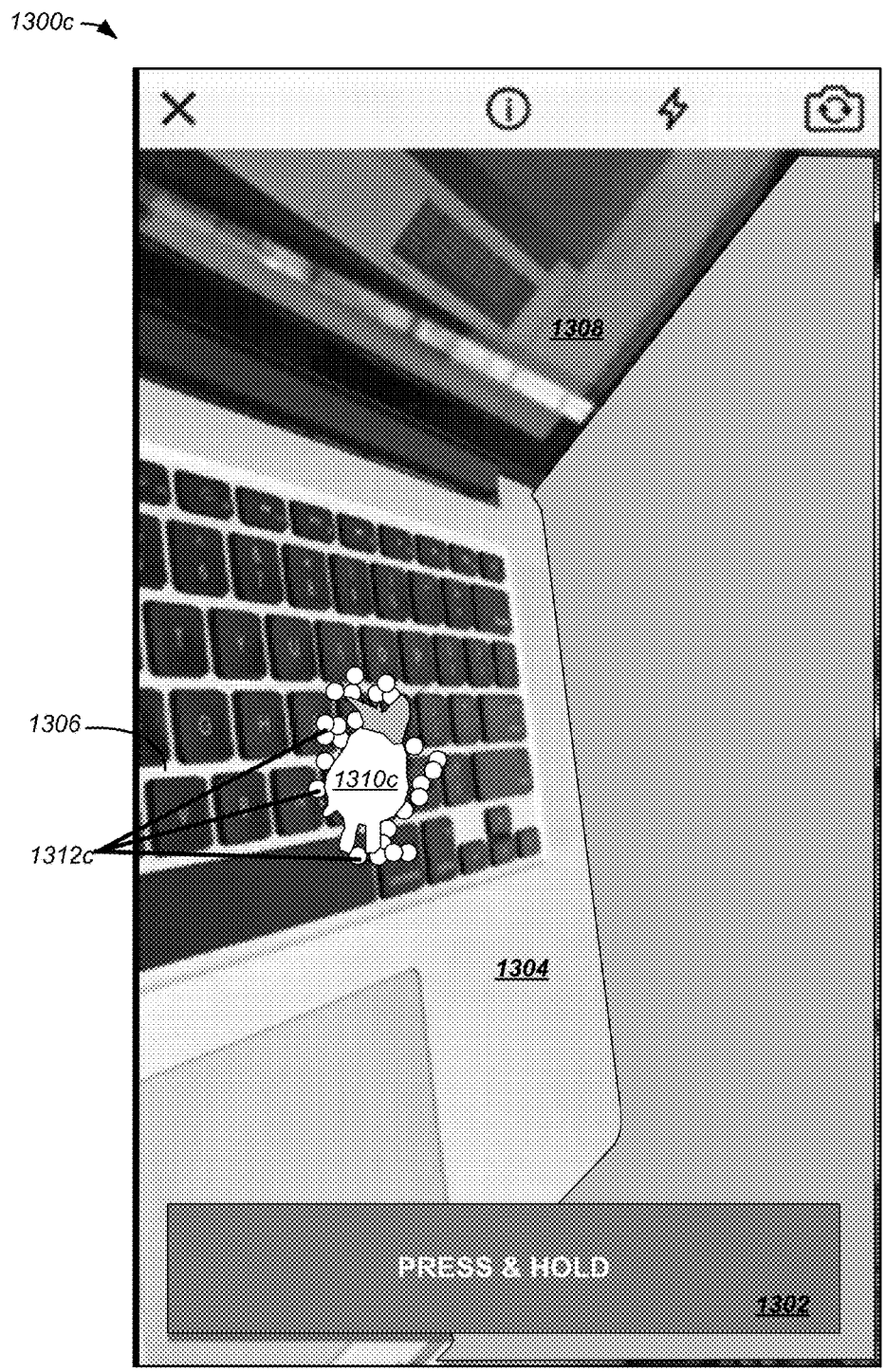

Next, with respect to FIGS. 13A-13C, another example of generating synthetic images using tracking points on a mobile device is described. In FIGS. 13A, 13B and 13C, live image data received from a camera on the mobile device is combined with a synthetic object projected into the image space to generate a synthetic image. Three synthetic images, 1300a, 1300b and 1300c are shown output to a display on the mobile device. When selected, the press and hold button 1302 allows a surround view to be recorded. In various embodiments, synthetic objects in the synthetic image may or may not be integrated into the surround view.

The three synthetic images include live image data of a laptop computer with a keyboard 1306, a touch pad 1305, a base 1304 including the touchpad and keyboard and a display 1308. The position of the mobile device relative to the laptop computer is varying from image to image. In FIGS. 13A and 13B, the mobile device is over the top of the keyboard. In FIG. 13C, the camera is positioned off to the side of the laptop.

In FIG. 13A, a 3-D model of a synthetic object 1310a has been attached to a region of the keyboard near the "M" key. A plurality of tracking points 1312a are shown to surround the synthetic object. The placement location of the synthetic object in the synthetic image can be in response to a user input, such as touching a touchscreen at the location where the synthetic object is to be placed. The synthetic object 1310a is modeled in three dimensions in model space and then projected into image space.

In FIG. 13B, the camera on the mobile device is moved closer to the keyboard 1306. The location and the number of tracking points have changed. However, the tracking points are still clustered around the same general location in the image. In this example, when the camera moves to the keyboard, the distance between some of the tracking points can change. In particular, the distance between the tracking points can move apart. In this example, the size of the synthetic object is selected to remain about the same size in the synthetic image. However, the keys in the live image data become larger. Hence, the synthetic object appears smaller relative to the size of the keys.

In FIG. 13C, the camera on the mobile device is moved and tilted to view the laptop from the side. The position of the tracking points changes in the image 1300c. However, the synthetic object still remains anchored at about the same location in the synthetic image 1300c, i.e., near the space bar and the space key. Further, the size of the synthetic object is kept about the same in the synthetic image. In particular, the synthetic object 1310c in image 1300c is similar in size to the synthetic objects, 1310a and 1310b, in 1300a and 1300b.

In particular embodiments, the tracking points can be tracked from frame to frame using Kanade-Lucas-Tomasi (KLT) tracking. In computer vision, the KLT feature tracker is an approach to feature extraction. KLT can make use of spatial intensity information to direct the search for the position that yields the best match. It can be faster than traditional techniques for examining far fewer potential matches between the images.

In another embodiment, optical flow techniques can be used to track points. Optical flows can be used to compute the motion of the pixels of an image sequence. It can provide a dense (point to point) pixel correspondence. A motion field can be the 2-D projection of a 3-D motion onto the image plane. An optical flow can be the apparent motion of the brightness pattern in an image sequence. The application of optical flow can include the problem of inferring not only the motion of the observer (or camera) and objects in the scene, but also the structure of objects and the environment. Some methods associated with optical flows that can be utilized herein include but are not limited to 1): Lucas-Kanade method—regarding image patches and an affine model for the flow field, 2) Horn-Schunck method—optimizing a functional based on residuals from the brightness constancy constraint, and a particular regularization term expressing the expected smoothness of the flow field, 3) Buxton-Buxton method—based on a model of the motion of edges in image sequences and 4) Black-Jepson method—coarse optical flow via correlation.

Figure 14:
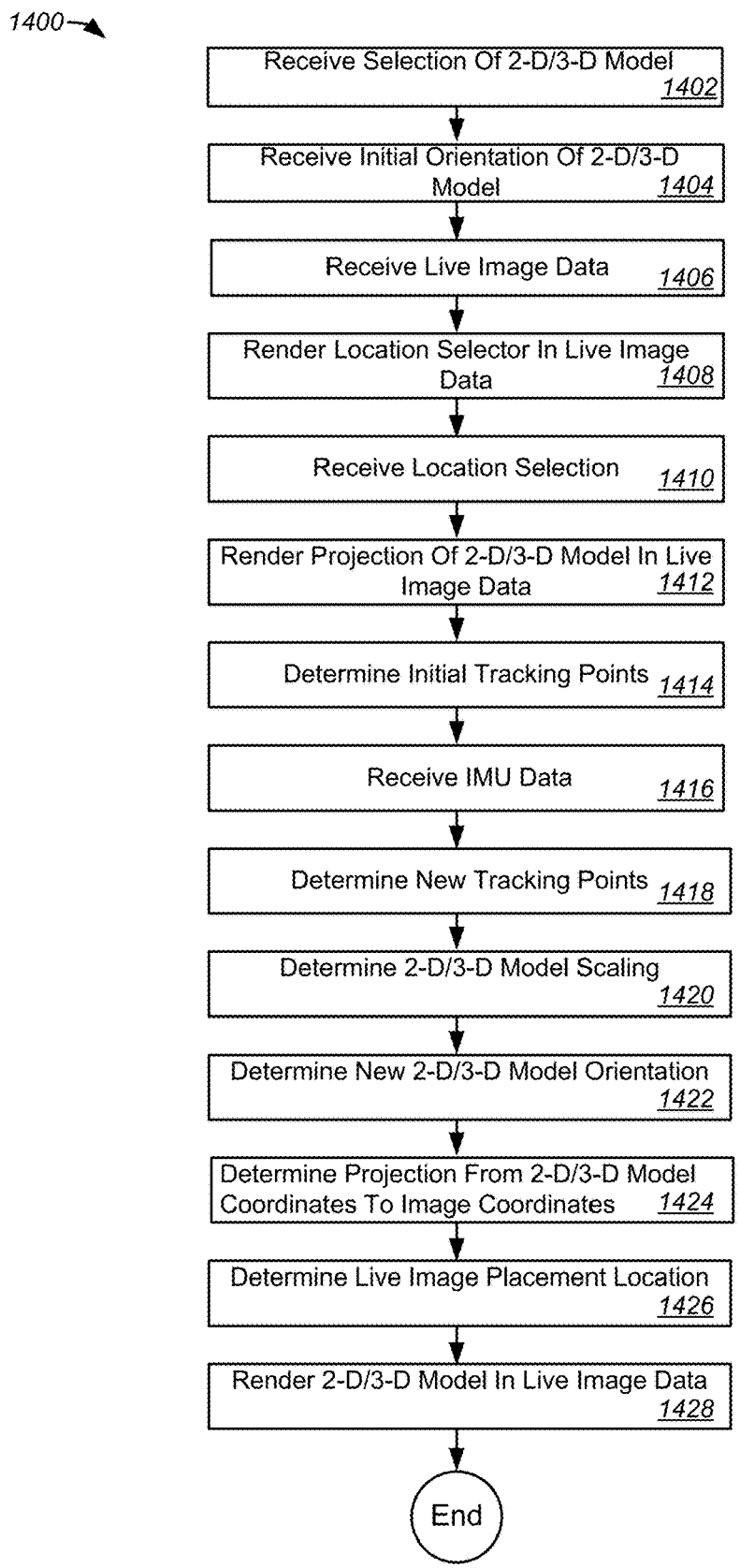
FIG. 14 illustrates an example of a process flow for generating augmented reality images using tracking points.

FIG. 14 illustrates an example of a process flow 1400 for generating synthetic images (also, referred to as Augmented Reality images) using tracking points. In 1402, a selection of a 2-D/3-D model can be received. The 2-D or 3-D model can be specified in model space. A user may be able to select from a plurality of 2-D/3-D models to place in a live image to create a synthetic image. Further, a system may allow multiple 2-D/3-D models to be selected for placement in the live image.

In 1404, an initial specification of the orientation of the 2-D/3-D model can be determined. In one embodiment, the initial orientation can be specified based upon user inputs. In 1406, live image data can be received, such as live image data from a mobile device.

In 1408, a synthetic image can be generated which includes live image data and a location selector rendered into the live image. The location selector can be a synthetic object. In one embodiment, the system may allow a position of the location selector to be moved in the synthetic image. In 1410, a location selection can be received. The location can be associated with an area in the synthetic image or features found in the synthetic image, such as objects.

In 1412, a projection of a selected 2-D/3-D model from model space into image space can be made based upon the location selected in the synthetic image. In 1414, initial tracking points can be associated with the location selected in the synthetic image. In 1416, IMU data can be received. The IMU data can be associated with an orientation a camera, such as a camera on a mobile device.

In 1418, a position of the camera can change. In response, new tracking point locations can be determined in the live image data. In 1420, based upon the changes in the tracking point locations in the new frame, scaling parameters can be determined. For example, if the tracking points move closer together then a synthetic object can be rendered smaller. The change in distances between tracking points can be used to determine scaling parameters in multiple directions, such as the horizontal and vertical directions.

In 1422, a new 2-D/3-D model orientation can be determined in model space. For example, in one embodiment, if the IMU data indicates the camera has rotated, then a 3-D model of a synthetic object in model space can be rotated. In 1424, a projection from model space to image space can be determined and/or selected. In 1426, a placement location in image space at which the projection of the 2-D/3-D model from model space can be determined. In one embodiment, the placement location may be determined based upon the locations of one or more tracking points in the image space. In 1428, based upon the 2-D/3-D model orientation in model space, a rotation and/or translation of a camera, a change in distance between tracking points, a change in position in the tracking points, a determined placement location in the live image data and/or combinations thereof, a synthetic object can be rendered into the live image to generate a synthetic image. The synthetic image can be output to the display.

Figure 15:
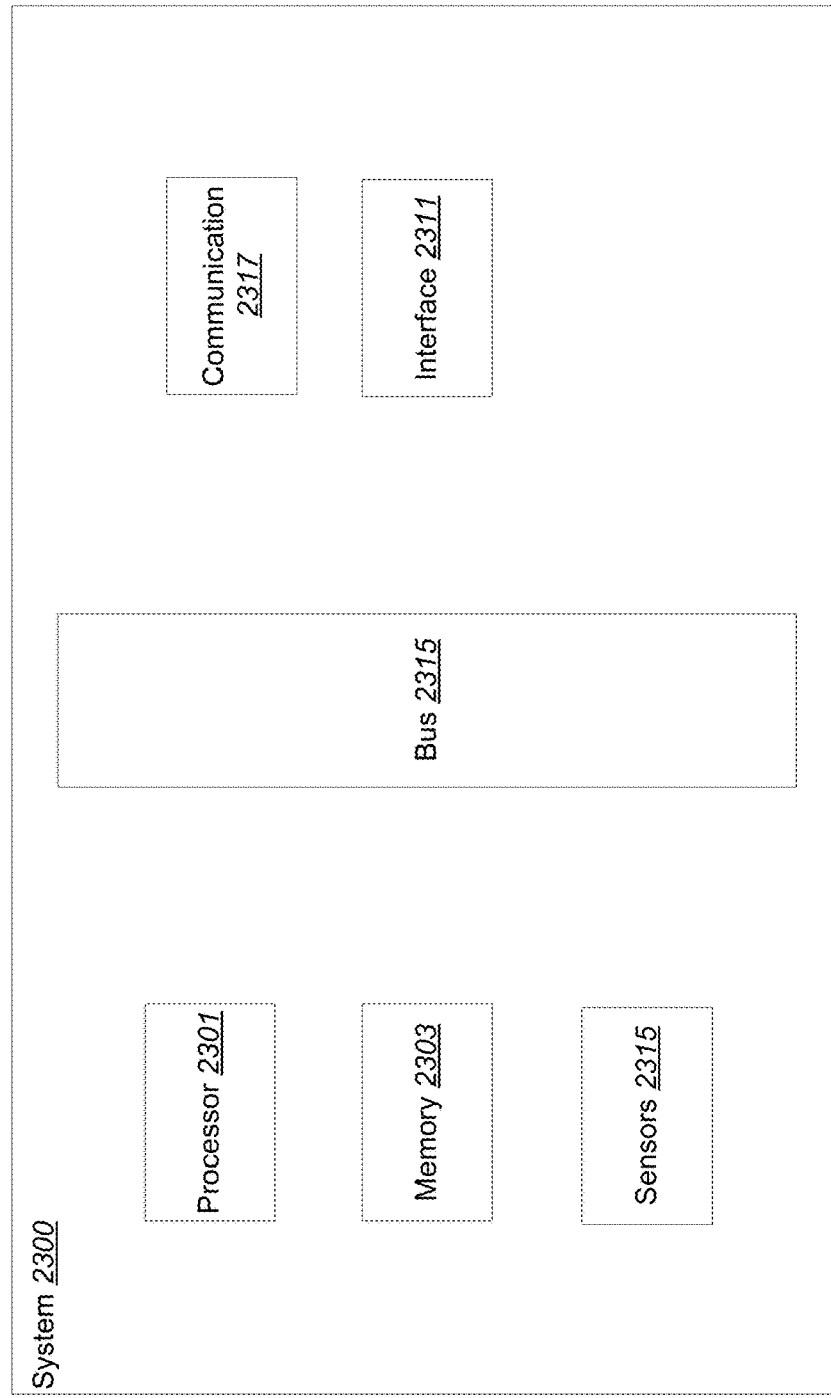
FIG. 15 illustrates a particular example of a computer system that can be used with various embodiments of the present invention.

With reference to FIG. 15, shown is a particular example of a computer system that can be used to implement particular examples of the present invention. For instance, the computer system 2300 can be used to provide surround views according to various embodiments described above. According to particular example embodiments, a system 2300 suitable for implementing particular embodiments of the present invention includes a processor 2301, a memory 2303, an interface 2311, and a bus 2315 (e.g., a PCI bus).

The system 2300 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones. When acting under the control of appropriate software or firmware, the processor 2301 is responsible for such tasks such as optimization. Various specially configured devices can also be used in place of a processor 2301 or in addition to processor 2301, such as graphical processor units (GPUs). The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 15, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a surround view. In addition, a virtual guide can be provided to help teach a user how to view a surround view in the wearable system. For example, the virtual guide can be provided in synthetic images output to head mounted display which indicate that the surround view can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    receiving a request to capture a plurality of images used to generate a multi-view interactive digital media representation of a real object appearing in the plurality of images;
    receiving first live images, including the real object, captured from a camera on a mobile device wherein the live images are output to a display on the mobile device and show what is currently being captured by the camera and wherein the live images comprise first 2-D pixel data;
    receiving first sensor data indicating a first orientation of the camera associated with a first image among the first live images;
    generating a first synthetic image comprising 1) a location selector rendered into the first 2-D pixel data associated with the first image wherein the location selector is a movable first virtual object in the first synthetic image that when selected causes a pixel location in the first image to be selected and 2) the real object;
    receiving, via a touch screen over the display and via the location selector, a selection of the pixel location in the first 2-D pixel data from the first image;
    determining a first pixel location in the first 2-D pixel data from the first image of a first tracking point wherein the first tracking point is within the first 2-D pixel data associated with the real object and is proximate to the pixel location selected via the location selector;
    generating a second synthetic image comprising 1) a second virtual object rendered into the first 2-D pixel data from the first image wherein the second virtual object is positioned in the first 2-D pixel data from the first live image relative to first pixel location of the first tracking point;
    outputting the second synthetic image to the display;
    receiving second live images captured by the camera after the first image is captured including second 2-D pixel data wherein the second live images include the real object from a plurality of different views;
    receiving second sensor data, associated with the second live images, indicating second orientations of the camera on mobile device associated with the plurality of different views;
    receiving second live image data including second 2-D pixel data from the camera;
    based upon the first sensor data, the second sensor data, the first 2-D pixel data and the second 2-D pixel data, determining, as the view of the real object in the second live images changes, second pixel locations of the first tracking point in the second 2-D pixel data of the second live images on an image by image basis wherein the second pixel locations are determined using one of spatial intensity information or optical flows derived from the second 2-D pixel data;
    generating a third synthetic images including the second virtual object rendered into the second 2-D pixel data at third pixel locations positioned relative to the second pixel locations of the first tracking point;
    outputting the third synthetic images to the display wherein each of the third synthetic images shows one of the different views of the real object as currently being captured by the camera and the second virtual object.

2. The method of claim 1, wherein the pixel location is over the real object captured in the first 2-D pixel data.

3. The method of claim 1, wherein the first virtual object is a target.

4. The method of claim 3, further comprising receiving an input indicating a selection of the real object captured in the first 2-D pixel data over which the target is rendered.

5. The method of claim 3, further comprising receiving input used to position the target over the pixel location.

6. The method of claim 5, wherein the input is received from the touch screen over the display of mobile device.

7. The method of claim 1, wherein one or more real objects that are moving are captured in the first live images and the second live images.

8. The method of claim 1, wherein the camera is coupled to the mobile device including an Inertial Measurement unit (IMU) wherein the first sensor data and the second sensor data is received from the IMU.

9. The method of claim 8, wherein the IMU includes at least one gyroscope and at least one accelerometer.

10. The method of claim 1, wherein the second virtual object is a 2-D or a 3-D model specified in a 3-D coordinate system.

11. The method of claim 10, further comprising projecting the second virtual object from the 3-D coordinate system into the first pixel data.

12. The method of claim 1, wherein the second pixel location in the second 2-D pixel data is determined using an optical flow.

13. The method of claim 1, further comprising determining a fourth pixel location in the first 2-D pixel data of a second tracking point and based upon the first sensor data, the second sensor data, the first 2-D pixel data and the second 2-D pixel data, determining a fifth pixel location of the second tracking point in the second 2-D pixel data using one of the spatial intensity information or the optical flows derived from the second 2-D pixel data.

14. The method of claim 13, further comprising determining a first distance in pixel space between the first pixel location of the first tracking point and the fourth location of the second tracking point;

determining a second distance between the second pixel location of the first tracking point and the fifth pixel location of the second tracking point in the pixel space and based upon the first distance and the second distance, scaling the second virtual object during the rendering into the second pixel data used to generate the third synthetic images.

15. The method of claim 1, further comprising receiving a selection of the second virtual object from among a plurality of virtual objects.

16. The method of claim 1, further comprising generating the multi-view interactive digital media representation of the real object using the second live image data.

17. The method of claim 1, further comprising generating the multi-view interactive digital media representation of the real object using the third synthetic images wherein the rendering of the second virtual object is included in the multi-view interactive digital media representation of the real object.

* * * * *